(12) United States Patent
Roberts et al.

(10) Patent No.: US 8,861,976 B2
(45) Date of Patent: Oct. 14, 2014

(54) TRANSMIT AND RECEIVE MIMO PROTOCOLS FOR LIGHT ARRAY COMMUNICATIONS

(75) Inventors: Richard D. Roberts, Hillsboro, OR (US); Jing Zhu, Portland, OR (US); Mathys C. Walma, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 13/538,888

(22) Filed: Jun. 29, 2012

(65) Prior Publication Data

US 2014/0003817 A1 Jan. 2, 2014

(51) Int. Cl.
*H04B 10/116* (2013.01)

(52) U.S. Cl.
USPC .......................................................... 398/172

(58) Field of Classification Search
CPC ..................................................... H04B 10/116
USPC .......................................................... 398/172
See application file for complete search history.

(56) References Cited

U.S. PATENT DOCUMENTS

| | | | |
|---|---|---|---|
| 5,394,259 A | 2/1995 | Takahara | |
| 5,600,471 A | 2/1997 | Hirohashi et al. | |
| 5,903,373 A * | 5/1999 | Welch et al. | 398/128 |
| 6,400,482 B1 * | 6/2002 | Lupton et al. | 398/140 |
| 6,594,050 B2 * | 7/2003 | Jannson et al. | 398/52 |
| 6,794,831 B2 * | 9/2004 | Leeb et al. | 315/307 |
| 6,954,591 B2 * | 10/2005 | Lupton et al. | 398/115 |
| 6,965,464 B2 * | 11/2005 | Mossberg | 359/34 |
| 7,689,130 B2 * | 3/2010 | Ashdown | 398/172 |
| 7,949,259 B2 * | 5/2011 | Suzuki | 398/172 |
| 8,070,325 B2 * | 12/2011 | Zampini et al. | 362/294 |
| 8,260,137 B2 * | 9/2012 | Linnartz | 398/77 |
| 8,334,901 B1 * | 12/2012 | Ganick et al. | 348/131 |
| 8,417,124 B2 * | 4/2013 | Ford | 398/143 |
| 8,488,971 B2 * | 7/2013 | Linnartz et al. | 398/118 |
| 8,494,367 B2 * | 7/2013 | Linnartz | 398/78 |
| 8,588,616 B2 * | 11/2013 | Langer et al. | 398/118 |

(Continued)

FOREIGN PATENT DOCUMENTS

| | | |
|---|---|---|
| EP | 1436952 A1 | 7/2004 |
| EP | 2106041 A1 | 9/2009 |
| WO | 2012/087944 A2 | 6/2012 |

OTHER PUBLICATIONS

International Search Report and Written Opinion received for Patent Application No. PCT/US2011/060578, mailed on Mar. 15, 2012, 10 pages.
International Search Report and Written Opinion received for Patent Application No. PCT/US2011/054441, mailed on Apr. 23, 2012, 11 pages.

(Continued)

*Primary Examiner* — Agustin Bello
(74) *Attorney, Agent, or Firm* — Garrett IP, LLC

(57) ABSTRACT

A Multiple-Input-Multiple-Output (MIMO) data transmit-receive protocol that can be used with an arbitrary light array, including one or more lights, that transmits light to a light receiver having an image sensor, including a large number of light sensing pixels. The protocol supports two primary protocol or coding modes in which the light array may transmit: spatial coding and space-time coding. The protocol is constructed upon the use of efficient start-frame-delimiters (SFDs) and data-delimiters (DDs). The lights may be implemented to transmit the SFDs, the data delimiters, and data bits as modulated light. The light may be modulated in accordance with a modulation technique referred to as frequency shift on-off keying (FSOOK).

68 Claims, 21 Drawing Sheets

(56) References Cited

U.S. PATENT DOCUMENTS

| | | | | |
|---|---|---|---|---|
| 8,620,165 B2 * | 12/2013 | Kim et al. | ............... | 398/172 |
| 8,630,549 B2 * | 1/2014 | Kim et al. | ............... | 398/172 |
| 8,693,878 B2 * | 4/2014 | Schenk et al. | ............... | 398/130 |
| 8,729,835 B2 * | 5/2014 | Henig et al. | ............... | 315/363 |
| 8,737,842 B2 * | 5/2014 | Schenk et al. | ............... | 398/172 |
| 2002/0145776 A1 * | 10/2002 | Chow et al. | ............... | 359/124 |
| 2002/0167701 A1 * | 11/2002 | Hirata | ............... | 359/172 |
| 2003/0081287 A1 * | 5/2003 | Jannson et al. | ............... | 359/139 |
| 2005/0002673 A1 * | 1/2005 | Okano et al. | ............... | 398/130 |
| 2006/0204172 A1 * | 9/2006 | Shahar | ............... | 385/27 |
| 2006/0239689 A1 * | 10/2006 | Ashdown | ............... | 398/130 |
| 2010/0271476 A1 * | 10/2010 | Damink et al. | ............... | 348/135 |
| 2010/0309958 A1 | 12/2010 | Lakkis | | |
| 2011/0002695 A1 * | 1/2011 | Choi et al. | ............... | 398/155 |
| 2011/0069971 A1 * | 3/2011 | Kim et al. | ............... | 398/172 |
| 2011/0075581 A1 | 3/2011 | Mihota | | |
| 2011/0144941 A1 | 6/2011 | Roberts | | |
| 2012/0008961 A1 * | 1/2012 | Chen et al. | ............... | 398/119 |
| 2012/0033965 A1 * | 2/2012 | Zhang et al. | ............... | 398/38 |
| 2012/0076498 A1 * | 3/2012 | Sayeed et al. | ............... | 398/115 |
| 2012/0099868 A1 * | 4/2012 | Fischer et al. | ............... | 398/115 |
| 2012/0162633 A1 * | 6/2012 | Roberts et al. | ............... | 356/5.09 |
| 2013/0028609 A1 * | 1/2013 | Staats et al. | ............... | 398/130 |
| 2013/0028612 A1 * | 1/2013 | Ryan et al. | ............... | 398/172 |
| 2013/0126713 A1 * | 5/2013 | Haas et al. | ............... | 250/208.2 |
| 2013/0247117 A1 * | 9/2013 | Yamada et al. | ............... | 725/93 |
| 2013/0301569 A1 * | 11/2013 | Wang et al. | ............... | 370/329 |
| 2014/0003817 A1 * | 1/2014 | Roberts et al. | ............... | 398/74 |
| 2014/0064739 A1 * | 3/2014 | Chen et al. | ............... | 398/130 |
| 2014/0086590 A1 * | 3/2014 | Ganick et al. | ............... | 398/118 |
| 2014/0153668 A1 * | 6/2014 | Xi et al. | ............... | 375/295 |

OTHER PUBLICATIONS

Roberts, et al., "Methods and Arrangements for Frequency Shift Communications by Undersampling", PCT Patent Application No. PCT/US2011/060578, filed on Nov. 14, 2011, 33 Pages.

Roberts, Richard R., "Methods and Arrangements for Frequency Shift Communications", PCT Patent Application No. PCT/US2011/054441, filed on Sep. 30, 2011, 23 Pages.

Roberts, et al., "Methods and Arrangements for Error Correction in Decoding Data From an Electromagnetic Radiator", U.S. Appl. No. 13/539,354, filed Jun. 30, 2012, 45 Pages.

Roberts, et al., "Methods and Arrangements for Generating a Waveform for Frequency Shift Keying Communications", U.S. Appl. No. 13/539,351, filed Jun. 30, 2012, 47 Pages.

Yoshino, et al., "High-accuracy Positioning System using Visible LED Lights and Image Sensor", 1-4244-1463-6/08 RWS 2008 IEEE, pp. 439-442.

Tanaka, et al., "New Position Detection Method using Image Sensor and Visible Light LEDs", IEEE Second International Conference on Machine Vision, Dec. 28-30, 2009, pp. 150-153.

Horikawa, et al., "Pervasive Visible Light Positioning System using White LED Lighting", vol. 103; No. 721(CS2003 178-197), 2004, pp. 93-99.

Roberts, et al., "Methods and Apparatus for Multiphase Sampling of Modulated Light", U.S. Appl. No. 13/630,066, filed Sep. 28, 2012, 71 Pages.

Roberts, Richard R., "Location Detection System", PCT Patent Application No. PCT/US2011/62578, filed on Nov. 30, 2011, 51 Pages.

Gopalakrishnan, et al., "Location Based Technology for Smart Shopping Services", PCT Patent Application No. PCT/US2011/067749, filed on Dec. 29, 2011, 18 Pages.

\* cited by examiner

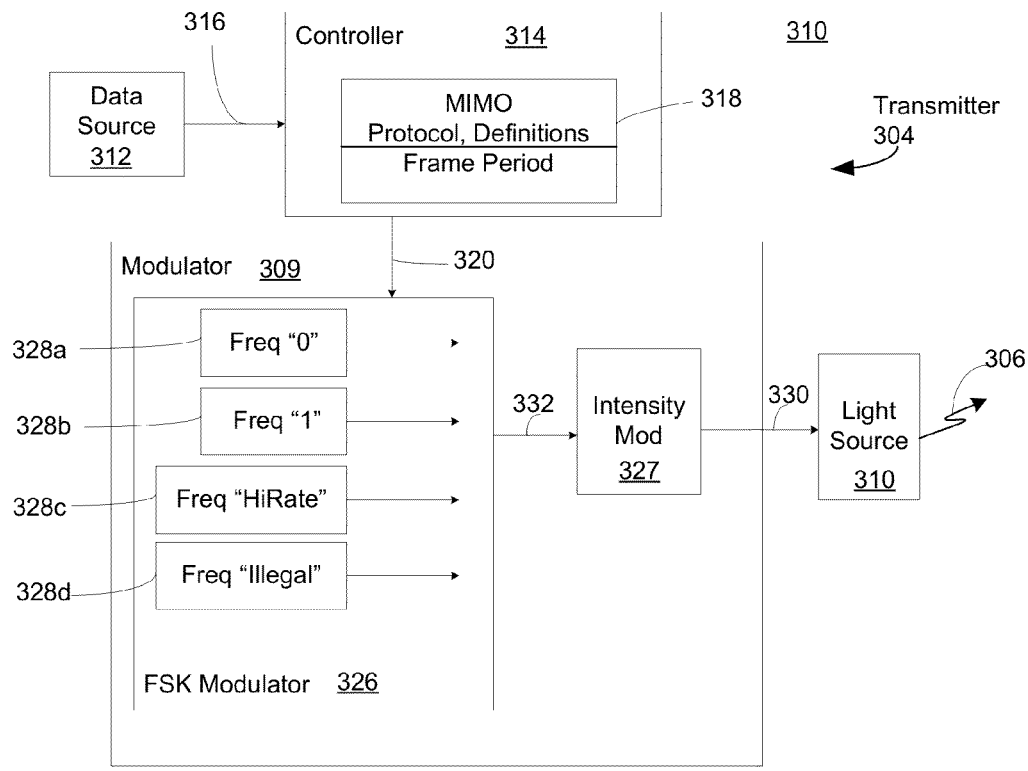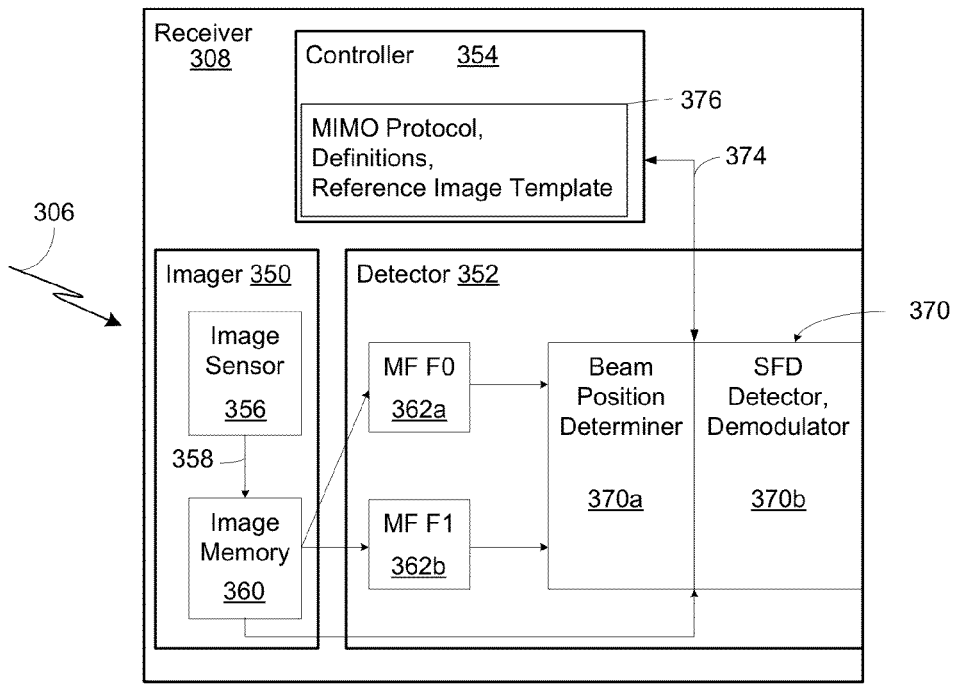
FIG. 3

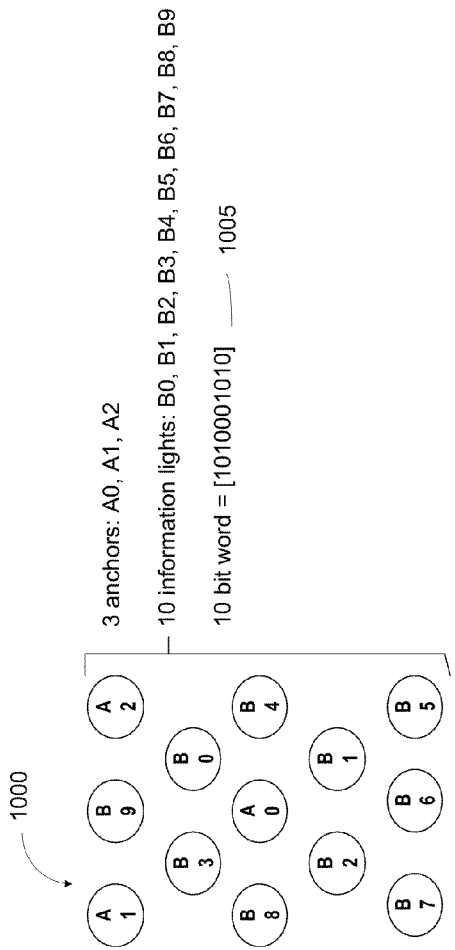

Space-time Coding, Spatial Multiplexing Example of an IPv6 Address:
   Example IPv6 address: [3ffe:1900:4545:0003:0200:f8ff:fe21:67cf]
   This could be sent with 8 LEDs, each with a 16 bit payload $LED_0$:  SFD,0,DD,67cf
   $LED_1$:  SFD,1,DD,fe21
   $LED_2$:  SFD,2,DD,f8ff
   $LED_3$:  SFD,3,DD,0200
   $LED_4$:  SFD,4,DD,0003
   $LED_5$:  SFD,5,DD,4545
   $LED_6$:  SFD,6,DD,1900
   $LED_7$:  SFD,7,DD,3ffe The totals bits sent would be: 2+3+3+16=24.
   At 15 bps the whole 128 IPv6 address could be sent in 1.6 seconds.

order can be completely random

FIG. 12A

Space-time Coding, Spatial Redundancy with an ID:

Payload (hex): 9f

This could be sent with 8 LEDs, each with a 16 bit payload

LED$_0$: SFD,0, DD,9f
LED$_1$: SFD,0, DD,9f
LED$_2$: SFD,0, DD,9f
LED$_3$: SFD,0, DDD,9f
LED$_4$: SFD,0, DD,9f
LED$_5$: SFD,0, DD,9f
LED$_6$: SFD,0, DD,9f
LED$_7$: SFD,0, DD,9f

The totals bits sent would be: 2+3+3+8=16.
At 15 bps the parallel payload sequence could be sent in 1.07 seconds.

FIG. 12B

Space-time Coding, Uncoordinated Transmission:

Payload (hex): e

Assume 8 un-coordinated LEDs, each with a 16 bit payload

LED$_0$: SFD,0, DD,e
LED$_1$: 1, DD,e,SFD
LED$_2$: DD,e,SFD,2
LED$_3$: e,SFD,3, DD
LED$_4$: DD,e,SFD,4
LED$_5$: SFD,5, DD,e
LED$_6$: DD,e,SFD,6
LED$_7$: 7, DD,e,SFD

For uncoordinated packets, the starting phases are random but the packets are cyclic, meaning for a minimum ingest time the full packet can be "un-wrapped" and recovered.

The totals bits sent would be: 2+3+3+4=12.
At 15 bps the bit sequence, including ID and payload, could be sent in 0.8 seconds.

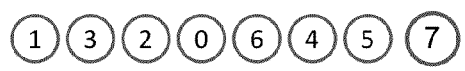

order can be completely random

```
┌─────────────────────────────────────┐
│ Recording a sequence of images of a │
│ group of simultaneous, spatially-   │──── 1405
│ separated, modulated light beams    │
│ transmitted from a group of lights  │
└─────────────────────────────────────┘
                  │
                  ▼
┌─────────────────────────────────────┐
│ Detecting, in at least some of the  │
│ recorded light beams, a start       │
│ delimiter spanning a first sequence │──── 1410
│ of the images, wherein the start    │
│ delimiter indicates one of multiple │
│ possible modes in which the group   │
│ of lights transmits                 │
└─────────────────────────────────────┘
                  │
                  ▼
┌─────────────────────────────────────┐
│ Demodulating, from each of at least │
│ some of the recorded light beams,   │
│ sequential data fields each         │──── 1415
│ spanning a sequences of images      │
│ following the start delimiter       │
└─────────────────────────────────────┘
                  │
                  ▼
┌─────────────────────────────────────┐
│ Processing the demodulated          │
│ sequential data fields according    │──── 1420
│ to the indicated mode               │
└─────────────────────────────────────┘
```

TRANSMIT AND RECEIVE MIMO PROTOCOLS FOR LIGHT ARRAY COMMUNICATIONS

BACKGROUND

Multiple-Input-Multiple-Output (MIMO) wireless communication employs multiple transmitters and multiple receivers to improve communication performance. Many protocols related to MIMO communication exist, including, e.g., space-time coding and spatial coding. When MIMO transmitters transmit multiple signals in accordance with one or more of such MIMO protocols to one or more receivers, the receivers must be able to process the multiple received signals intelligently and recombine them as necessary. Typically, a MIMO protocol governs signal processing at both the transmitters and the receivers, such that the transmitters and receivers implement complimentary halves of the protocol.

Conventional MIMO protocols for light communication (also referred to as "MIMO light protocols") tend to be configured for a single MIMO mode or protocol. Conventional MIMO light protocols tend to be inefficient, and do not support or facilitate efficient switching between multiple MIMO modes/protocols, such as both space-time coding and spatial coding, at a light transmitter or receiver. Moreover, such protocols tend not to take into account the relatively low rate at which many commercial imagers, such as smartphone cameras, sample and record received light. Such limitations substantially reduce the effectiveness of conventional MIMO light communication systems.

BRIEF DESCRIPTION OF THE DRAWINGS/FIGURES

FIG. 3 is a block diagram of an example light communication system useful to introduce the principles of frequency shift on-off keying (FSOOK) modulation and detection/demodulation, as it applies to MIMO protocols.

FIG. 10A is an end-on-view of an example light array, corresponding to a light array from FIG. 7C, that transmits light using spatial coding.

FIG. 10B is a diagram of example light packets transmitted by the light array from FIG. 10A, according to the packet definitions for spatial coding.

FIG. 12A is a MIMO space-time coding example of spatial multiplexing.

FIG. 12B is MIMO space-time coding example of spatial redundancy with an ID.

FIG. 12C is another MIMO space-time coding example in which light emitting diodes (LEDs) each transmit a different ID with a payload in an uncoordinated manner.

FIG. 14 is a flowchart of an example method of processing recorded light in a receiver in accordance with one of multiple MIMO protocols.

Figure 1A:
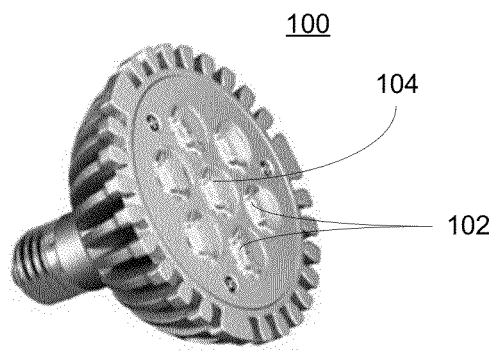
FIG. 1A is an illustration of an example light array, which may be used with MIMO protocols.

In the drawings, the leftmost digit(s) of a reference number identifies the drawing in which the reference number first appears.

DETAILED DESCRIPTION

Described below is an embodiment of a MIMO data transmission protocol that can be used with an arbitrary light array, including one or more lights, that transmits light to a receiver having an image sensor (also referred to as an imager), such as a camera, typically including a large number of light sensing pixels. The protocol supports two primary MIMO protocols or coding modes in which the light array may transmit: spatial coding and space-time coding. The protocol is constructed upon the use of efficient start-frame-delimiters (SFDs) and data-delimiters (DDs). The lights may be implemented to transmit the SFDs, the data delimiters, and data bits as modulated light. The light may be modulated in accordance with a modulation technique referred to as frequency shift on-off keying (FSOOK). Recovery and detection of the data delimiters and data bits at the image sensor is facilitated by maintaining a harmonic relationship between a time period over which the SFDs, data delimiters, and data bits are transmitted and an anticipated sample rate (also referred to as a frame rate), at which the image sensor captures or records sequential image, or frames, of the modulated light.

For the space-time coding protocol, the lights of the array self-identify using the FSOOK modulation/demodulation to indicate their sequence numbers in the array. Each light can transmit an optional payload of data bits such as part of an Internet Protocol (IP) address or an access point basic service set identifier (BSSID) hash.

For the spatial coding, positions of the lights in the light array correspond to bit sequence orders, and such information facilitates message recover in a receiver.

A challenge overcome by the MIMO protocol is the low sample rate, i.e., frame rate, of many typical imagers, such as cell phone cameras, which have a sample rate of, e.g., 30 frames per second. This means that the maximum transmit symbol rate that satisfies the Nyquist sampling criteria is half of the frame rate, which in this case is 15 bits-per-second (bps). Such low symbol rates require a very efficient, non-elaborate protocol to keep transmission times within the limits of human endurance.

The ensuing description is divided into the following sections:

Example Light Arrays
Light Beam Diagram
Light Communication System Using FSOOK.
    Light Transmitter
    Light Receiver
Protocol Packet Definitions
Light Arrays Implementing MIMO Protocols
MIMO Protocol
    High-Level Protocol
    Detailed-Level Protocol
        Spatial Coding
        Space-Time Coding
            Spatial Redundancy with a Null ID
            Spatial Redundancy with an ID
            Spatial Multiplexing
Spatial Coding/Decoding Example
Space-Time Coding Examples
Application Example
Method Flowcharts
    Spatial-Coding/Decoding Method
    Multiple Protocol Handling Method
Computer Processor System
Wireless Communication Receiver System
Computer Program, Method, Apparatus, and System Embodiments
Light Arrays FIG. 1A is an illustration of an example light array 100, which may employ MIMO protocols. Light array 100 includes LEDs 102 that are spatially-separated from each other in 2-dimensions, but clustered closely together around a center LED 104.

Figure 1B:
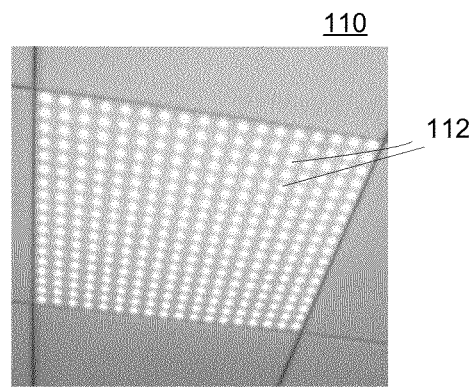
FIG. 1B is an illustration of another example light array, which may use MIMO protocols.

FIG. 1B is an illustration of an example light array 110, which may employ MIMO protocols. Array 110 includes a rectangular array of LEDs 112 that are spatially-separated so as to be relatively far apart from each other compared to lights 102 of array 100.

Figure 1C:
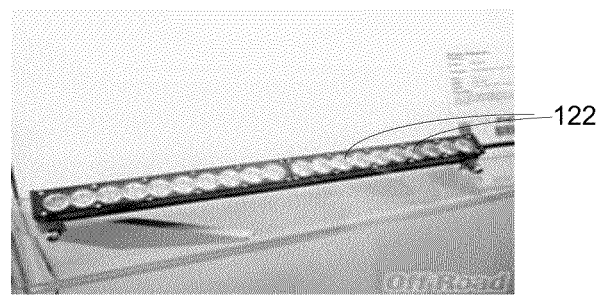
FIG. 1C is an illustration of yet another example light array, which may employ MIMO protocols.

FIG. 1C is an illustration of an example light array 120, which may employ MIMO protocols. Array 110 includes a linear array, or line bar, of LEDs 122.

Light Beam Diagram

Figure 2:
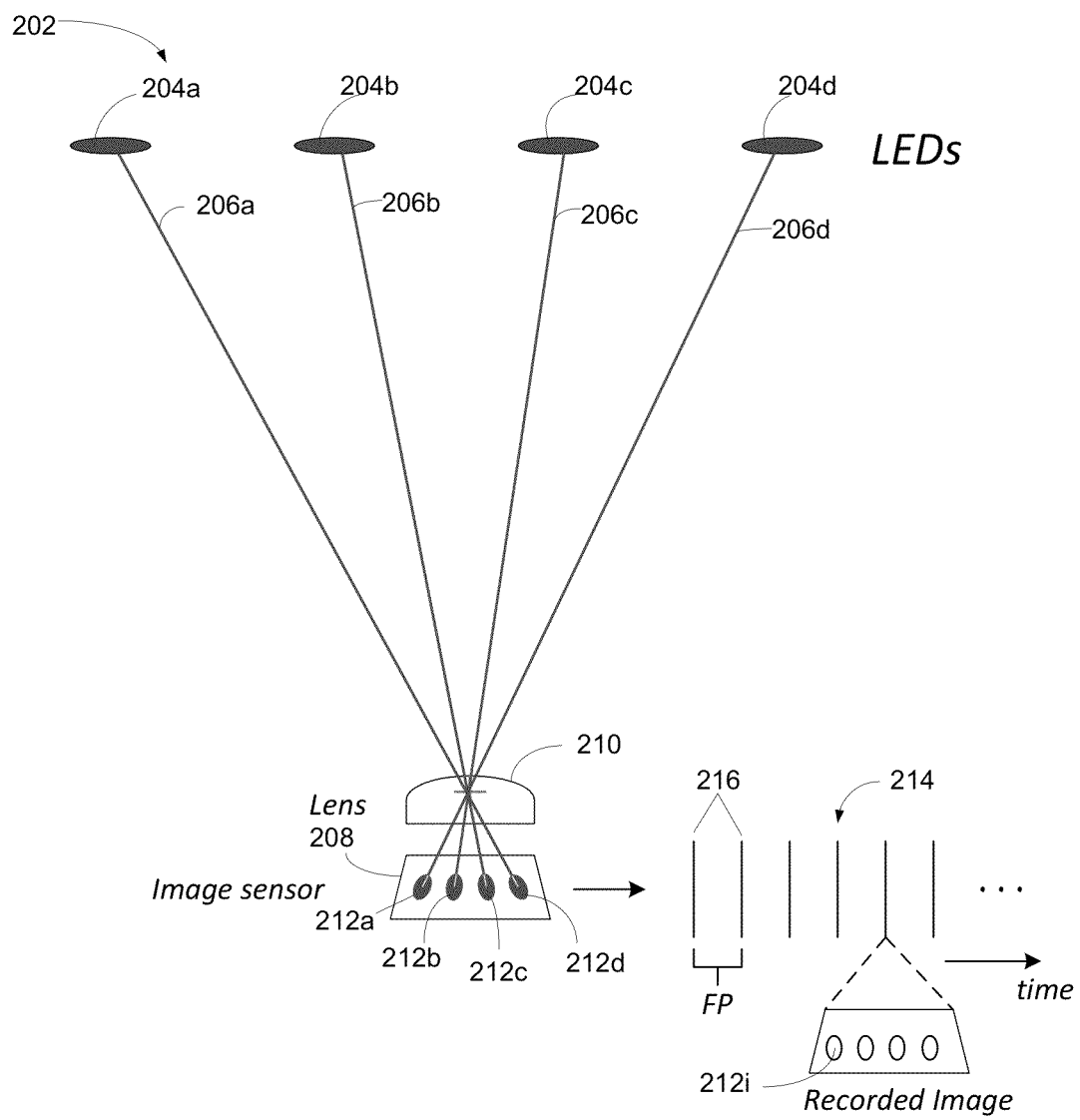
FIG. 2 is a diagram of an example light communication system employing spatially-separated beams.

FIG. 2 is a diagram of an example light array 202 that may employ MIMO protocols described herein. FIG. 2 introduces concepts helpful to understanding the MIMO protocols described later. Light array 202 may be configured similarly to any of light arrays 100, 110, and 120, or any other light array including spatially-separated lights. Array 202 includes lights 204*a*-204*d* implemented to transmit simultaneously a respective one of free-space optical light beams 206*a*-206*d* to a multi-dimensional or planar image sensor 208, through an imaging lens 210.

Image sensor 208 may be a multi-dimensional charge coupled device (CCD) array including many sensor pixels, as is known in the art. Light beams 206*a*-206*d* are sufficiently spatially-separated from one another as to form corresponding beam images 212*a*-212*d*, or light spots, on spatially-separated areas of image sensor 208. Each of light spots/areas 212*i* occupies a position, e.g., an x-y position on an image sensor plane, corresponding to a cluster of sensor pixels. Over time, image sensor 208 repetitively captures or records, simultaneous light beams 206*i* impinging on areas 212*i*, to produce a time-ordered sequence 214 of recorded images 216 of light array 202.

Image sensor 208 captures the images at a predetermined frame rate of, e.g., approximately 30 frames/second, i.e., every 1/30 seconds. Therefore, sequential images 216 are spaced in time by a frame period FP equal to an inverse of the frame rate. Sequential images 216 may be processed in accordance with methods described herein.

As will become apparent from the ensuing description, the MIMO protocols take advantage of an a priori knowledge of the anticipated frame rate/frame period FP at which the images will be captured/recorded/sampled at the image sensor.

Light Communication System Using FSOOK

FIG. 3 is a block diagram of an example light communication system 300 useful to introduce the principles of FSOOK modulation and detection/demodulation, as it applies to MIMO protocols. System 300 includes a light transmitter 304 (depicted at the top of FIG. 3) to transmit a FSOOK modulated light beam 306 to a light receiver 308 (depicted at the bottom of FIG. 3), which detects and demodulates the received light. The FSOOK modulated light beam conveys modulated light packets formatted according to MIMO protocol light packet definitions.

Light Transmitter

Light transmitter 304 includes a light modulator 309 to intensity modulate a light source 310, a data source 312, and a controller 314 to control the transmitter. Data source 312 provides data 316, such as a message in the form of data bits, to controller 314. Controller 314 includes a memory 318 to store MIMO protocol control logic, protocol light packet definitions, and a frame period. Based on data 316 and the contents of memory 318, controller 314 generates commands 320 to cause modulator 309 to modulate light source 310 in accordance with the MIMO protocol.

Modulator 309 includes an FSK modulator 326 and an intensity modulator 327 that together generate a modulation signal 330 to FSOOK modulate light source 310. In response to controller commands 320, FSK modulator 326 outputs a selected one of the following frequencies as an FSK signal 332 for a time period equal to an integer number of frame periods, such as two or more frame periods, which facilitates detection and demodulation of the frequency at receiver 308:

a. a first frequency 328*a* F0 (e.g., 120 Hz) indicative of a logic 0 of a data bit 316 to be transmitted;

b. a second frequency 328*b* F1 (e.g., 105 Hz) indicative of a logic 1 of the data bit to be transmitted;

c. a third frequency 328c "HiRate" indicative of a MIMO protocol start-frame-delimiter to be transmitted. The HiRate frequency is orders of magnitude greater than frequencies F0, F1, e.g., many KHz or above; and d. a fourth frequency 328d "Illegal" (e.g., 112.5 Hz, i.e., half-way between frequencies F0, F1) indicative of a MIMO protocol data delimiter to be transmitted.

FSK modulator 326 may include a voltage, or digitally, controlled oscillator that generates the above frequency responsive to commands 320. The terms "tone" or "tones" and "frequency" or "frequencies" are used equivalently and interchangeably herein.

Figure 4:
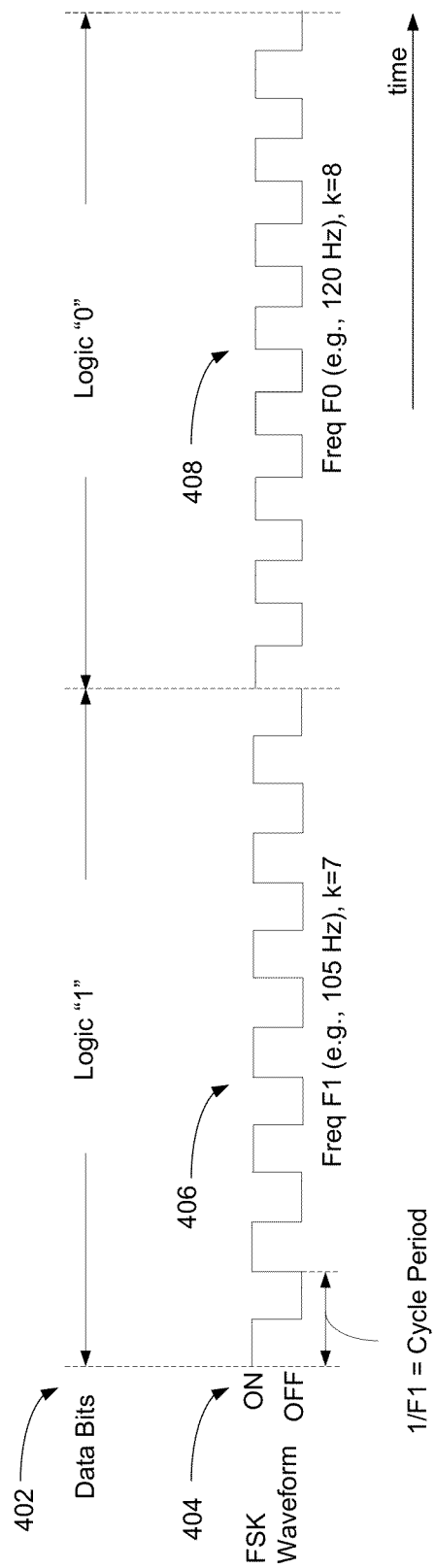
FIG. 4 is an illustration of an example timing diagram of a frequency shift keying (FSK) waveform corresponding to an FSK signal from FIG. 3.

FSK modulator 326 may generate each of the frequencies F0, F1, HiRate, and Illegal of FSK signal 332 as a substantially rectangular, or ON-OFF keying, waveform, where ON represents a logic 1 of the FSK waveform, and OFF represents a logic 0 of the FSK waveform. Also, to transmit a data bit, each of frequencies F0 and F1 may extend over multiple frame periods, and may be harmonically related to the frame period such that an integer number, k, of ½ cycles or periods of the rectangular FSK waveform matches the frame period, as is depicted in FIG. 4 (described below). Each of the frequencies F0, F1, HiRate, and Illegal, together with the respective number of frames over which they are transmitted, form a part of the MIMO protocols to be described more fully below. More specifically, transmitter 304 combines these parameters into the above mentioned modulated light packets formatted in accordance with the MIMO protocols definitions, and then transmits the light packets.

FIG. 4 is an illustration of an example timing diagram 402 of an FSK waveform 404 corresponding to FSK signal 332 in FIG. 3. In response to commands 320 to transmit two consecutive data bits, e.g., a logic 1 followed by a logic 0, FSK modulator 326 first generates an ON-OFF keying waveform 406 at frequency F1 (e.g., 105 Hz) for a time period of two frames to represent the logic 1 data bit, and then an ON-OFF keying waveform 408 at frequency F0 (e.g., 120 Hz) for a period of two frames to represent the logic 0 data bit. The relationship between frequencies F0 and F1 and the period of two frames is such that (i) waveform 406 at frequency F1 includes seven full cycles or periods, i.e., k=7, during the data bit period, and (ii) waveform 408 at frequency F0 includes eight full cycles, i.e., k=8, during the second data bit period. In other words, over a data bit period, eight cycles of FSK signal 332 represent a logic 0, while seven cycles represent a logic 1.

Intensity modulator 327 intensity modulates light source 310 based on the modulation signal 330, to produce modulated light beam 306. Light source 310 may be an LED that emits light in any of the visible, infrared, or ultraviolet light spectrums. In an embodiment, modulation signal 330 follows the shape of FSK signal 332 and adjusts a current through light source 310 to proportionally adjust an intensity of light 306 emitted by the light source. In this manner, ON-OFF keying of modulation signal 330 causes corresponding ON-OFF keying of the intensity of light 306, such that the intensity closely follows ON-OFF keying waveforms 404, 406 depicted in FIG. 4. Other intensity modulation embodiments are possible, e.g., light source 310 may not be turned off completely during the OFF cycle of the FSK waveform, and so on. For example, a reduced light intensity (e.g., ½ maximum intensity) from light source 310 may serve as an alternative for the HiRate frequency. Applying a reduced steady state drive current to the light source 310 will cause the light intensity emitted by the light to be correspondingly reduced.

Transmitter 304 is depicted with one light 310 for simplicity only. Embodiments include many lights each driven by a corresponding light modulator, as will be described later in connection with FIGS. 7C and 7D.

Light Receiver

Light receiver 308 receives the modulated light packets conveyed in modulated light beam 306. In embodiments, light receiver 308 will receive many modulated light beams simultaneously. Light receiver 308 includes an imager 350 to capture/record received modulated light beam 306 as images, a detector 352 to detect and demodulate the modulated light recorded in the images, and a controller 354 to control the receiver and process the recorded images in accordance with a MIMO protocol.

Imager 350 includes an image sensor 356, such as a 2-dimensional CCD array, that repetitively records or samples light impinging on the sensor, such as light beam 306, to produce a time-ordered sequence of 2-dimensional images 358 (similar to images 216 depicted in FIG. 2). Image sensor 356 records images 358 at a predetermined rate equal to the frame rate, and stores the images in an image memory 360.

Detector 352 includes matched filters 362a, 362b (collectively referred to as "matched filters 362"), a beam position determiner module 370a, and a SFD detector/demodulator module 370b (collectively referred to as "modules 370" and "modules 370a, 370b"), which cooperate to process the sequence of images stored in memory 360, namely to:

determine a position of each beam recorded in the images, such as an x, y center coordinate of the beam in each image (using beam position determiner 370a); and from the modulated light recorded at the determined beam positions, both detect any delimiters (SFDs) and demodulate any DDs or data bits conveyed by that recorded light (using detector/demodulator 370b).

Matched filter 362a has an integration time matched to a half period or less of the waveform of frequency F0, so as to maximally detect recorded light that is intensity modulated at frequency F0 (for a logic 0 data bit). Matched filter 362a recovers FSK waveform pulses to which the filter is matched, such as the pulses of waveform 408, and provides the recovered pulses to modules 370a, 370b. Similarly, matched filter 362b has an integration time matched to a half period or less of the waveform of frequency F1 and maximally detects recorded light that is intensity modulated at frequency F1 (for a logic 1 data bit). Matched filter 362b recovers pulses to which the filter is matched, similar to the pulses in waveform 406, and provides the recovered pulses to modules 370a, 370b.

To detect a beam position, beam position determiner 370a uses matched filters 362 to raster scan the full 2-dimensional area of each image in a sequence of images from memory 360, e.g., first, second, third, and fourth sequential images, and so on, in search of recorded light energy that has a correlated position across the sequence of images. In other words, a beam position is determined when beam position determiner 370a detects a spot of modulated light, or simply light energy, centered on the same position, e.g., an x, y position, in each of the sequential images. Beam positions for multiple, spatially-separated, simultaneously recorded beams may be determined in this manner.

From each determined position, matched filters 362 provide their respective pulses to SFD detector/demodulator module 370b. SFD detector/demodulator 370b associates the outputs from matched filters 362, over multiple recorded images, to one of: a demodulated data bit level, i.e., logic 0 or logic 1; a demodulated data delimiter; and a detected SFD.

Figure 5:
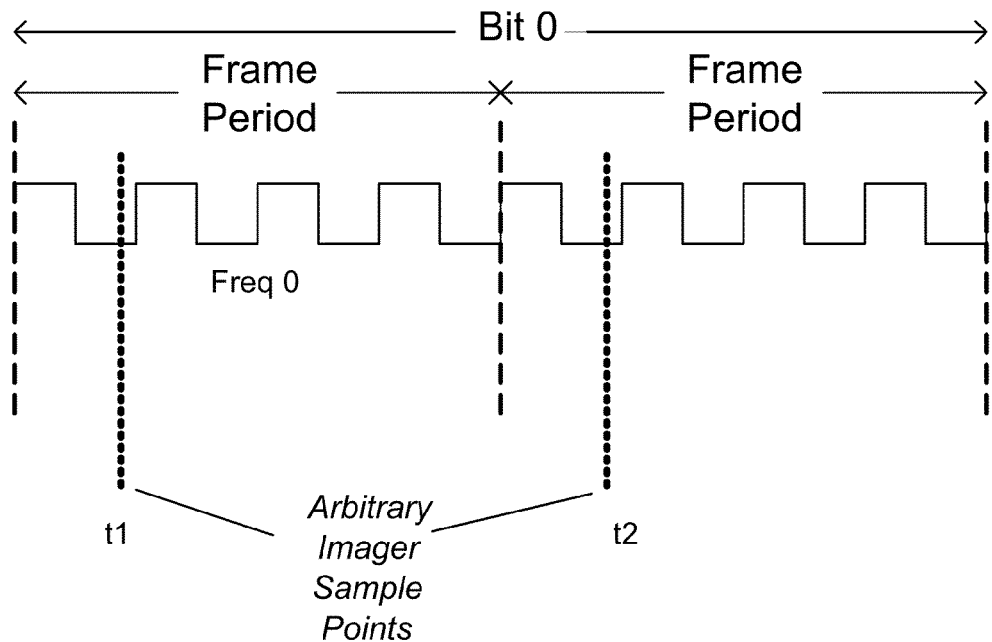
FIG. 5 is an example timing diagram indicating how a detector of FIG. 3 associates an output of a matched filter with a demodulated logic zero (0).
Figure 6:
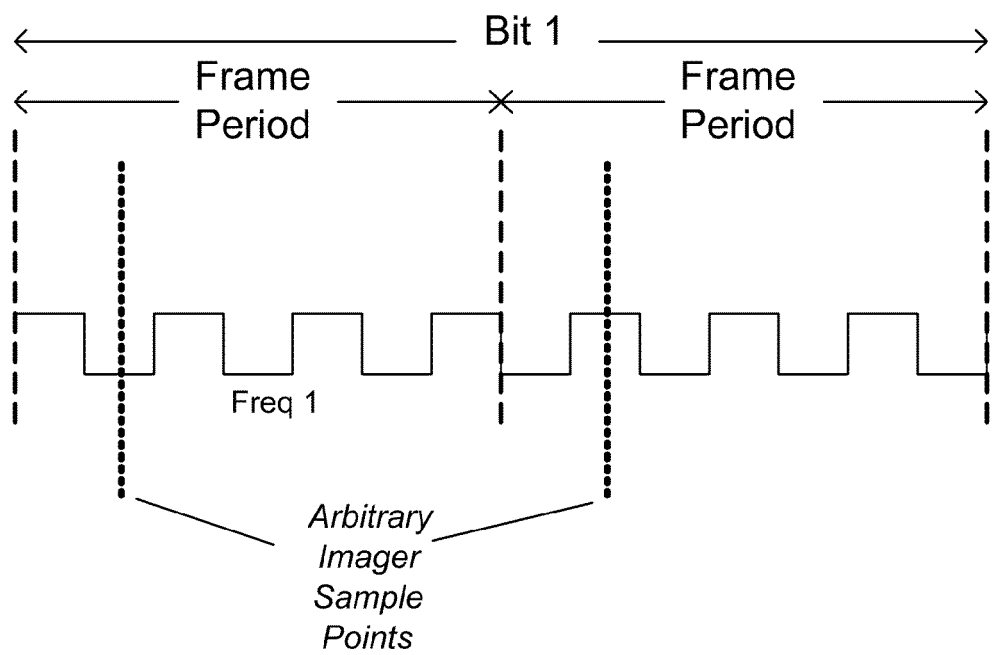
FIG. 6 is an example timing diagram indicating how the detector of FIG. 3 associates an output of a matched filter with a demodulated logic one (1).

FIGS. 5 and 6 are helpful in understanding how SFD detector/demodulator 370b associates matched filter outputs with demodulated data bits. FIG. 5 is an example timing diagram indicating how SFD detector/demodulator 370b associates the output of matched filter 362a with a demodulated logic 0. Given the relationship between the 120 Hz ON-OFF keying of light 306 (as recorded) and the frame period (i.e., the time between image recordings at t1 and t2 in FIG. 5), the recorded light, as detected by matched filter 362a, will appear in the same amplitude state (either ON or OFF) in two consecutive images. Depicted in FIG. 5 are sequential OFF states at t1 and t2. Therefore, SFD detector/demodulator 370b demodulates a logic 0 if matched filter 362a indicates in two consecutive images two consecutive ON states or two consecutive OFF states.

FIG. 6 is an example timing diagram indicating how SFD detector/demodulator 370b associates the output of matched filter 362b with a demodulated logic 1. Given the relationship between the 105 Hz ON-OFF keying of light 306 (as recorded) and the frame period, the recorded light, as detected by matched filter 362b, will appear to toggle (ON then OFF, or OFF then ON) between states in two consecutive images. Depicted in FIG. 6 is a consecutive OFF then ON. Therefore, SFD detector/demodulator 370b demodulates a logic 1 if matched filter 362b indicates such a change in states over two consecutive images.

Modules 370a, 370b also monitor the output from matched filters 362 to detect light modulated with the Illegal frequency, as an indicator of a DD associated with the data. As mentioned above in connection with demodulated data bits, the relationships between the frame period and the frequencies F0, F1 respectively causes detected light in two consecutive images always to be either in the same state, or in different states. However, the relationship between the frame period and the Illegal frequency causes detected light to toggle ON and OFF over four consecutive images in an ON-OFF pattern that cannot occur when the light is modulated at frequencies F0, F1. More specifically, if matched filters 362 indicate any of patterns ON-ON-OFF-OFF, OFF-OFF-ON-ON, ON-OFF-OFF-ON, and OFF-ON-ON-OFF over four consecutive images, then modules 370a, 370b detect the Illegal frequency associated with the data delimiter.

Modules 370a, 370b also monitor the output from matched filters 362 to detect light modulated with the HiRate frequency, as an indicator associated with the SFD. While each of matched filters maximally detects frequencies F0, F1 in the modulated light, i.e., produces a maximum amplitude output in response to the matched frequency, the integration time of each of the filters is too long to respond fully to the much greater HiRate frequency. Therefore, both filters serve as suboptimal energy detectors in response to the HiRate frequency, and provide an average, e.g., approximately ½ maximum, amplitude output in response to the HiRate frequency. Therefore, modules 370a, 370b detect the SFD in modulated light beam 306 when both matched filters 362 provide the average, lesser amplitude outputs in response to sequential images. Similarly, in a transmit embodiment in which a reduced light intensity serves as an alternative for the HiRate frequency, matched filters 362 provide an average, lesser amplitude indicative of the reduced light intensity.

From recorded light at a determined position in a sequence of images, modules 370a, 370b demodulate frequencies F0, F1 into data bit logic levels, detect the HiRate frequency, and detect the Illegal frequency associated with the start-frame-delimiter and the data delimiter. Modules 370a, 370b also detect the number of frames over which each of the above mentioned frequencies extend. In this way, detector 352 deconstructs or determines the modulated light packets conveyed in the recorded light beam(s). Modules 370a, 370b pass such information to controller 354 over a bidirectional interface 374. For example, over interface 374, modules 370a, 370b indicate detected SFDs and DDs from recorded light packets to controller 354, and provide demodulated data bits from the light packets to the controller.

Controller 354 includes a memory 376 to store MIMO protocol control logic, protocol light packet definitions, and a frame period. In embodiments described in detail below, memory 376 may also store a reference image template representative of light array, including one or more light sources, such as light source 310. Controller 354 provides light packet protocol definitions to detector 352. Based on the information from detector 352 and the contents of memory 376, controller 354 operates and controls receiver 308 in accordance with the MIMO protocol. Controller 354 is also referred to herein as a "protocol processor."

Protocol Packet Definitions

Figure 7A:
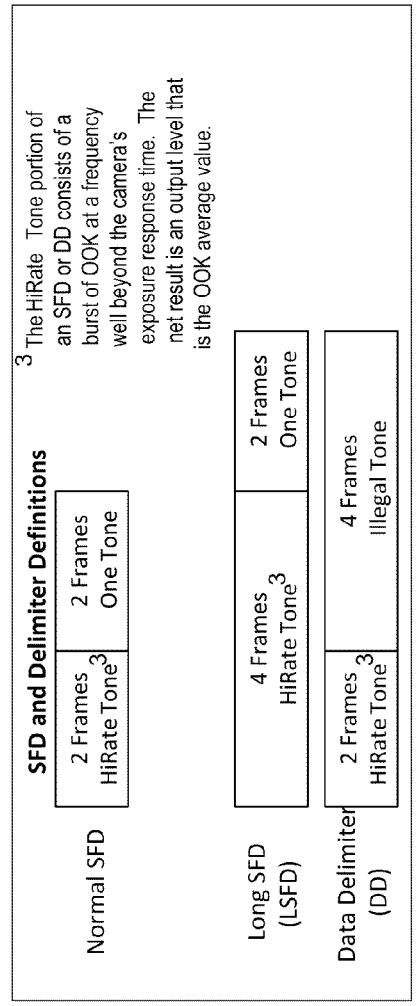
FIG. 7A is a table of MIMO protocol definitions, specifically, definitions for light packet delimiters, including start-frame-delimiters (SFDs) and a data delimiter (DD).

FIG. 7A is a table 700 of MIMO protocol definitions for modulated light packets, specifically for delimiters, including SFDs and DDs. The term "frame" means a time period equal to a frame period, i.e., 1/frame rate. The MIMO protocols described herein involve transmitting and receiving light packets of FSOOK modulated information (i.e., modulated light packets), also referred to as MIMO protocol packets. Each packet includes a contiguous sequence of fields, beginning with a SFD, which may be either a normal SFD (NSFD) or a long SFD (LSFD). Then, if a packet carries a data payload, the packet also includes a DD before the data payload.

Referring to table 700, a NSFD includes 2 frames of the HiRate tone followed by 2 frames of the one tone. This means that the NSFD begins with light that is intensity modulated (FSOOK modulated) at the HiRate frequency for a time period of 2 frames. This is followed by 2 more frames of light modulated at frequency F1 to indicate a logic 1.

Similarly, a LSFD includes 4 frames of the HiRate tone followed by 2 frames of the one tone.

A data delimiter includes 2 frames of the HiRate tone followed by 4 frames of the illegal tone.

Figure 7B:
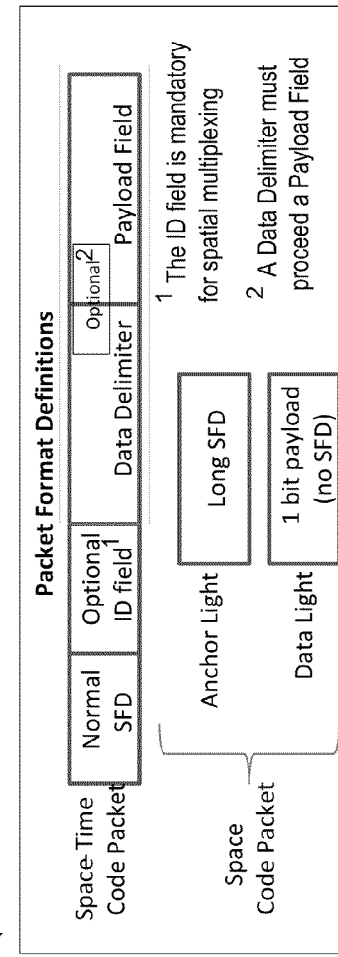
FIG. 7B is a table of further MIMO protocol definitions, specifically, light packet format definitions.

FIG. 7B is a table 720 of further MIMO protocol packet format definitions. MIMO protocols described herein may be broadly categorized into two classes or protocols, space-time coding and space coding. Each protocol communicates in packets defined in table 720, i.e., table 720 defines a packet format for both the space-time coding protocol and the space coding protocol.

A packet formatted for the space-time coding protocol includes the following contiguous fields: a NSFD (defined in table 700); an optional identifier (or ID) field; a DD (defined in table 700); and an optional data for carrying data bits. The packet includes the DD only if the packet carries a payload. The ID and data payload are each transmitted as normal data bits, i.e., as light modulated at either of the frequencies F0, F1.

Light Transmitters Implementing MIMO Protocols

Figure 7C:
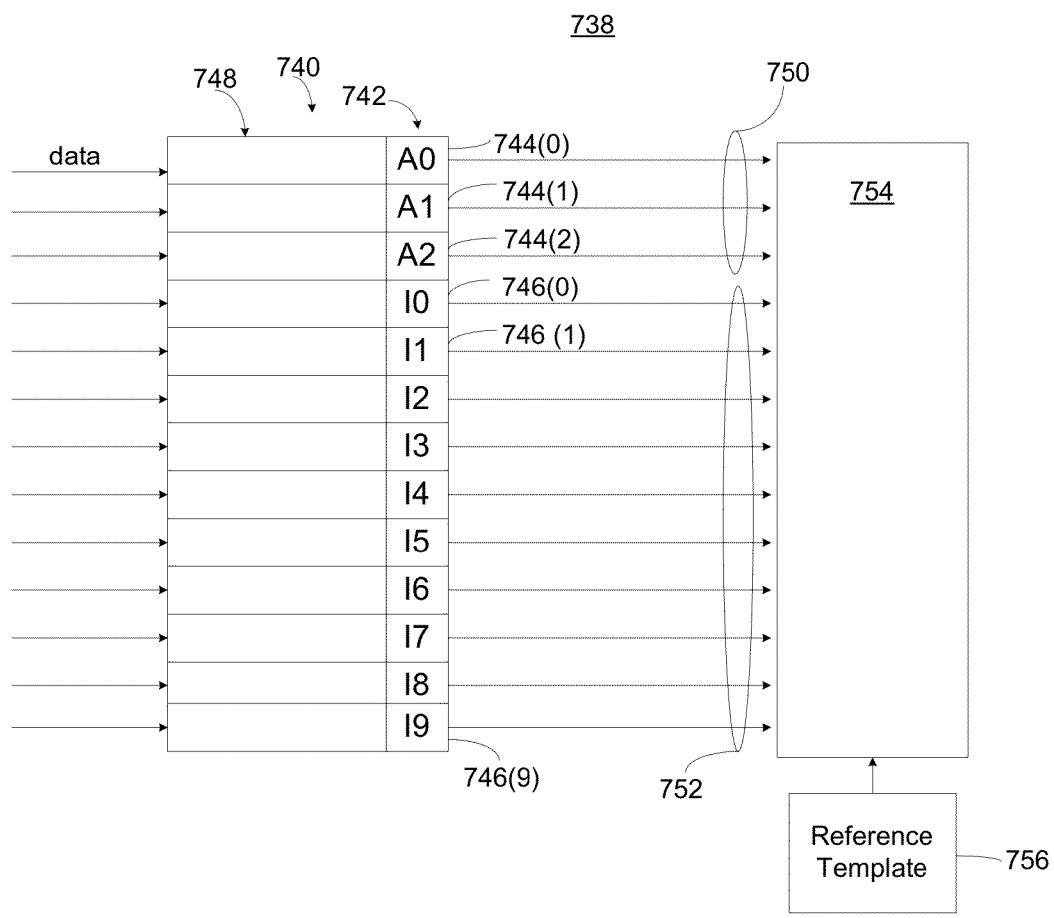
FIG. 7C is a block diagram of an example light communication system that communicates according to a first MIMO protocol, such as spatial coding.

FIG. 7C is a block diagram of an example light communication system 738 that performs light communication according to a first MIMO protocol, such as spatial coding. System 738 includes a light transmitter 740 to transmit light according to the protocol. Light transmitter 740 includes a 2-dimensional array or group of spatially-separated lights 742 (depicted only in 1-dimensionion in FIG. 7C). Lights 742 include anchor lights 744(0)-(2) having positions within the array to form a unique, identifiable shape, e.g., the lights may form the vertices of a 2-dimensional shape in the array, such as a triangle. Lights 742 include information lights 746(0)-(9) having predetermined positions relative to anchor lights 744. In embodiments, more or less anchor and information lights may be employed. Also, the array may employ a 1-dimensional array. Also, the array may include only one light.

Transmitter 740 includes light modulators 748, which may be implemented similarly to modulator 309 in FIG. 3, each to modulated light from a corresponding one of lights 742. Controllers, such as controller 314 in FIG. 3, may be incorporated into each of modulators 748, or may be external to the modulators. Modulators 748 receive data bits from a data source (not shown), and modulate their corresponding lights simultaneously with each other according to the received data bits, and in accordance with the protocol packet definitions listed in FIGS. 7A (table 700) and 7B (table 720). In response, anchor lights 744 transmit modulated anchor light beams 750, and information lights 746 transmit modulated information light beams 752.

Lights 742 transmit spatially-separated, modulated light beams to convey protocol packets, so as to implement spatial coding. The light beams may be free-space light beams or transmitted via light pipes, such as optical fibers. In this way, lights 742 are said to be implemented to transmit modulated light in accordance with a MIMO protocol. As indicated in table 720, anchor lights 744 each simultaneously and repeatedly transmit modulated light to convey an anchor light packet, including a LSFD (see table 700), 4 frames of HiRate tone, followed by 2 frames of logic 1 tone). Only anchor lights 744 transmit the LSFD.

At the same time, information lights 746 each simultaneously and repeatedly transmit modulated light to convey an information light packet, namely, a DD (see table 700), followed by one data bit (Ii) representing the packet payload. The one data bit transmitted by each of information lights 746 is assigned a bit position in a message according to a position of that information light in the array of lights. For example, if a message of 10 bits is to be transmitted, each of lights 746 repeatedly transmits a bit from one assigned position in the message according to a position of the light in the array, hence the label "spatial coding." The bit transmitted by each light is correlated with a spatial position only; there is no time-dimension because the bit transmitted over time by each light does not change over time for a given message.

System 738 also includes a light receiver 754 to sequentially record images of modulated light beams 750 and 752. Receiver 754 processes the recorded protocol light packets conveyed by the recorded light beams to implement the MIMO protocol on the receive end of system 738. To perform spatial decoding, light receiver 754 accesses a stored, predetermined reference template 756 representing the array of lights 742. Reference template 756 is essentially a scaled picture of the light array 742, including reference anchor light positions corresponding to positions of the anchor lights in the light array, and reference information light positions corresponding to positions of the information lights in the light array. In addition, the reference template maps the reference information light positions to assigned bit positions in a message. Light receiver 754 processes the recorded images with access to predetermined reference template 756 to implement the MIMO protocol on the receive end, and recover the message bits in the information light packets, as will be more fully described below in connection with FIG. 9.

Figure 7D:
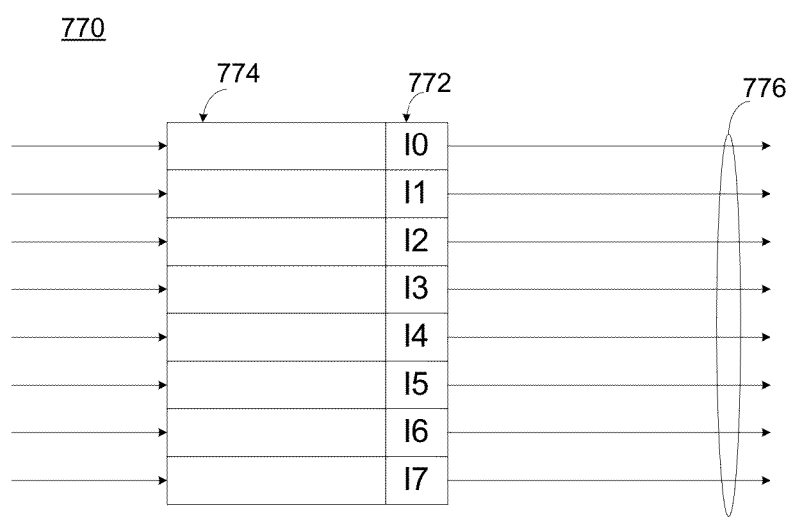
FIG. 7D is a block diagram of an example light transmitter to transmit light according to a second MIMO protocol, such as space-time coding.

FIG. 7D is a block diagram of an example light transmitter 770 to transmit light according to a second MIMO protocol, such as a space-time coding. Light transmitter 770 includes an array or group of spatially separated lights 772. Transmitter 770 includes light modulators 774 each to modulate light from a corresponding one of lights 772. Controllers, such as controller 314, may be incorporated into each of modulators 774, or may be external to the modulators. In an embodiment of space-time coding referred to as spatial multiplexing, modulators 748 each receive data bits representing a segment of a message that has been divided into segments, and modulate their corresponding lights simultaneously with each other according to the received segment data bits and in accordance with the packet definitions listed in FIGS. 7A and 7B. In response, lights 772 transmit modulated light beams 776. The light beams may be free-space light beams or transmitted via light pipes, such as optical fibers.

Lights 772 transmit modulated light beams 776 to convey light packets as defined in tables 700 and 720, so as to implement space-time coding. In this way, lights 772 are said to be implemented to transmit modulated light in accordance with a MIMO protocol, such as space-time coding. As indicated in table 720, all of lights 772 each simultaneously transmit a space-time coding light packet, including a NSFD (2 frames of HiRate tone, followed by 2 frames of the logic 1 tone, see table 700).

Lights 772 then transmit sequential protocol packet fields depending on a particular form or branch of the space-time protocol in which they are operating. For example, in spatial multiplexing branch, each of lights 772 transmits an ID following the NSFD. Each light ID represents a sequence number of that light transmitting that ID among the group of lights 772. The sequence number identifies which light is to transmit which message segment of the divided message.

In spatial multiplexing, following the ID, each of lights 772 transmits a DD to indicate a data payload is to follow. Then, following the DD, each of lights 772 transmits its payload, e.g., assigned message segment. Each message segment may include multiple bits and, therefore, each light may transmit different bits over time for any given message and message segment. Accordingly, the lights transmit their respective bits in accordance with their inherent positions in the array and those bits may change over time, therefore, the protocol by which the bits are transmitted includes both a positional or "space" component and a time-dimension or "time" component, hence, the spatial multiplexing is a form of "space-time coding."

A light receiver, not shown, records the modulated light beams 776 in sequential images and processes the images in accordance with the appropriate MIMO protocol. For example, in a receiver implementing spatial de-multiplexing, message segments demodulated from recorded packets associated with an ID may be assembled in an order corresponding to the ID.

As indicated in tables 700 and 720, and as will be discussed below, many other variances of space-time coding are possible.

MIMO Protocol Flowcharts

High-Level Flowchart

Figure 8:
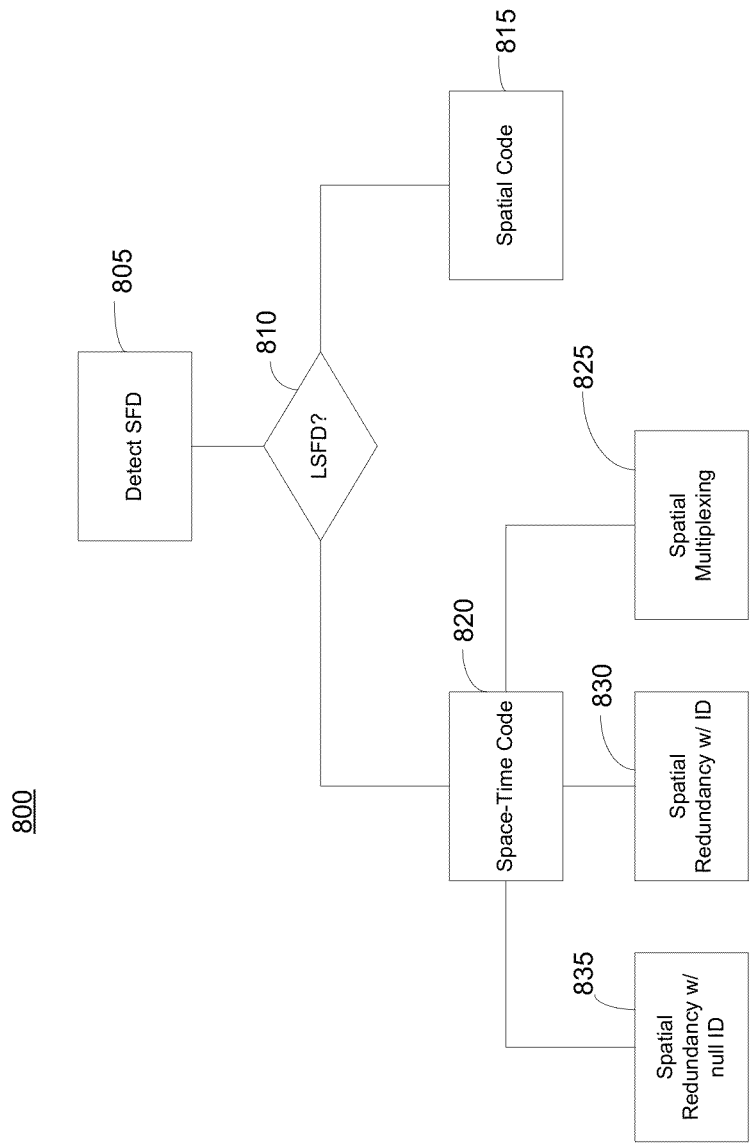
FIG. 8 is a flowchart of an example high-level MIMO protocol or method, including branches for both spatial coding and space-time coding.

FIG. 8 is a flowchart of an example high-level MIMO protocol or method 800, including both spatial coding (on the right-hand side) and space-time coding (on the left-hand side). Protocol 800 is described from the perspective of a light receiver, i.e., as a MIMO receive protocol, for processing light beam images recorded from, e.g., one of transmitters 738 (FIG. 7C) and 770 (FIG. 7D).

Protocol 800 is described with reference also to the protocol definitions listed in FIGS. 7A and 7B.

At 805, from recorded light images, a modulated light packet including a SFD is detected, e.g., in the light receiver.

At step 810, it is determined whether the SFD is a LSFD indicating spatial coding or a NSFD indicating space-time coding.

If the SFD is a LSFD, then flow proceeds to 815, where further fields in the packet are processed according to a spatial coding protocol.

If the SFD is a LSFD, then flow proceeds to 820, where the packet is processed in accordance with a space-time protocol. At 820, further sequential fields in the light packet are reviewed to determine which of three main branches of the space-time protocol should be invoked to further process the packet.

Flow may proceed to any one of 825 for a spatial multiplexing protocol, 830 for spatial redundancy with an ID protocol, and 835 for spatial redundancy with a null ID protocol.

Protocol 800 is repeated each time a demodulated light packet is received and a SFD (either LSFD or NLSFD) is detected in the packet.

Each of the various protocols mentioned above are described in greater detail in connection with FIG. 9.

Detailed-Level Protocol Flowchart

Figure 9:
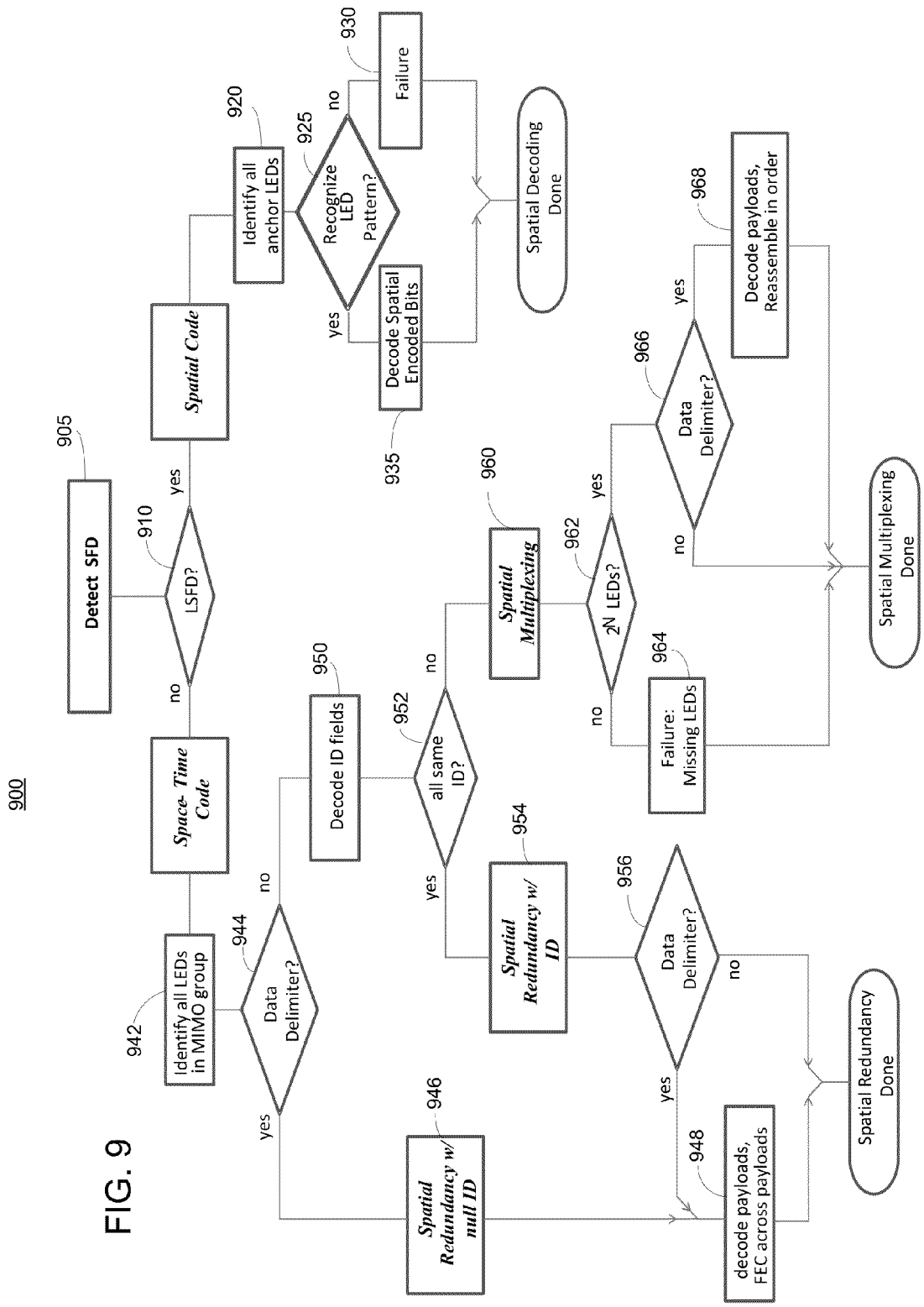
FIG. 9 is a flowchart of an example, detailed MIMO protocol or method corresponding to the protocol of FIG. 8.

FIG. 9 is a flowchart of an example detailed MIMO protocol or method 900 corresponding to protocol 800, implemented in a light receiver. Assuming modulated light packets are received and recorded into images in parallel, each recorded packet, once detected, is processed in parallel with the other detected packets. Over time, as more modulated light packets are sequentially received, the protocol is sequentially repeated to handle the new packets. Also, as is understood from the foregoing description, each packet spans a sequence of recorded images and frames. For example, with reference to FIG. 7B, a space time code packet may include a NSFD spanning a first sequence of recorded images/frames, an ID field spanning a second sequence of recorded images/frames, a DD spanning a third sequence of recorded images/frames, and a data payload spanning a further sequence of recorded images/frames. The protocol processing below sequentially traverses and determines the contiguous fields in each packet from start to end because the content of each field may direct/divert protocol processing flow.

At 905, a modulated light packet including a SFD is detected.

At 910, it is determined if the SFD is a LSFD. If it is then flow proceeds to 920, the start of spatial coding protocol 815.

Spatial Coding/Decoding

The spatial coding protocol is described below in the context of spatial-coding light communication system 738, described above in connection with FIG. 7C. In system 738, receiver 754 records a sequence of images of modulated anchor and information light beams 750, 752, and has access to predetermined image template 756 that represents the positional pattern of lights 772 in the array of lights 742 in the transmitter, i.e., representing the spatial arrangement of array of lights 742 imaged by the receiver.

At 920, recorded anchor beams are identified as those anchor beams in which the LSFD is detected. Once detected, the positions of the recorded anchor beams in each of the sequence of images are determined.

At 925, an attempt is made to positionally-align the recorded images with the predetermined image template representing the transmitter array of lights based on the determined anchor beam positions from 920. This may include:

rotating the recorded images so that an orientation of the shape formed by the determined anchor light positions in the images matches an orientation of a reference shape formed by the reference anchor light positions in the template; and scaling a size of the recorded images so that a size of the shape formed by the determined anchor light positions in the images matches a size of the reference shape.

If the attempt to align at 925 fails, then flow proceeds to 930 and the protocol processing ends.

If the attempt to align at 925 succeeds, then, at 935, data bits carried by the recorded information beams are demodulated and combined into a message in the following manner:

First, positions of the recorded information light beam in the aligned images are determined based on reference information light positions in the reference template;

Second, each recorded information beam is demodulated at its determined position to recover a corresponding data bit, e.g., logic 0 or 1;

Third, a bit sequence number is assigned to each of the recorded information light beams in the image based on bit sequence numbers associated with reference information lights in the predetermined image template; and Fourth, a message is assembled from the demodulated information bits based on the assigned bit sequence numbers from the predetermined image template.

Returning again to 910, if a NSFD is detected instead of a LSFD, then flow proceeds to 942, the start of space-time protocol processing.

Space-Time Coding/Decoding

It is assumed at this stage that modulated light beams have been recorded from a light transmitter implementing a form of space-time coding, such as transmitter 770 in FIG. 7D. At the light transmitter, all of the lights in a light array that implement a space-time protocol, referred to as a MIMO group, together simultaneously transmit a NSFD.

At 942, the recorded images are scanned image by image to search for a group of recorded beams in which the NSFDs are simultaneously detected. Once found, that group of recorded light beams may be processed together in accordance with a space-time protocol.

At 944, a next sequential field of the packet (after the NSFD) is demodulated from each of the recorded beams in the group. If the next demodulated field is a DD, i.e., there is a null ID field, then the next field after the DD is a payload including data bits. Flow proceeds to 946 for processing in accordance with a branch of the space-time protocol referred to as spatial redundancy with a null ID (see 835 in FIG. 8).

Spatially Redundancy with a Null ID

In spatial redundancy with a null ID, each of the transmitter lights transmits a packet including an identical data payload or message.

At 946, the payload, carried by each of the recorded beams after the data delimiter, is demodulated.

At 948, bit voting to achieve error correction (e.g., forward error correction) is performed across all of the demodulated payloads to produce a best message.

Returning to 944, if the next demodulate field is an ID (not a data delimiter), then flow proceeds from 944 to 950, where all of the demodulated IDs are examined. Exemplary values for an ID range from 0 to $2^{N-1}$. From 950, flow proceeds directly to 952.

At 952, it is determined whether all of the IDs are the same. If all of the IDs are the same, then flow proceeds to 954 for further processing in accordance with a branch of the space-time protocol referred to as spatial redundancy with an ID (see 830 in FIG. 8). Flow proceeds to 956.

Spatial Redundancy with an ID

At 956, a next sequential field of each packet is demodulated. If it is determined that the next demodulated field is a DD, then the next sequential field in the packet is a payload. The payload is demodulated in each packet, and flow proceeds to 948 for bit voting. Otherwise, the process ends.

Returning to 952, if it is determined that all of the IDs are not the same, then flow proceeds to 960 for further processing in accordance with a third branch of the space-time protocol referred to as spatial multiplexing (see 825 in FIG. 8).

Spatial Multiplexing

Flow proceeds from 960 to 962, where it is determined if the recorded group of beams includes a predetermined number of light beams, e.g., $2^N$ beams. If the predetermined number is not present, then flow proceeds to 964 and further processing ends.

Otherwise, if the predetermined number of beams in the group is present, then flow proceeds to 966, where an attempt to demodulate the next sequential field is made. If there is no further sequential field, then processing ends. Otherwise, flow proceeds to 968.

At 968, a next sequential field is demodulated to recover data bits from the packet payloads of each of the recorded beams. In spatial multiplexing, the demodulated ID for each recorded beam indicates a sequence number or order in which the demodulated payload data bits carried by that recorded beam are to be assembled relative to the payload bits recovered from the other recorded beams. Accordingly, at 968, a received message is assembled from the demodulated bits from each of the beams in an order indicated by the corresponding demodulated IDs.

Spatial Coding/Decoding Example

FIGS. 10A, 10B, 11A, and 11B are diagrams associated with an example of spatial coding and spatial decoding.

FIG. 10A is an end-on-view of an example light array 1000 corresponding to light array 740 in FIG. 7C, that transmits light using spatial coding. Light array 1000 includes spatially-separated lights, including 3 anchor lights A0-A1, and 10 information lights B0-B9 (10-19 in FIG. 7C). The anchor beams form vertices of an identifiable shape, e.g., a triangle. Information lights B0-B9 are each assigned to transmit a bit from a corresponding bit position 0-9 of a 10 bit message 1005 (lsb-1010001010-msb), in accordance with the positions of the information lights in the array. As depicted, lights B0, B2, B6, and B8 each transmit logic 1, while the others each transmit logic 0. The configuration is fixed over time, meaning that each information light repetitively transmits the same bit from the assigned bit position.

FIG. 10B is a diagram of the example light packets 1010 transmitted by light array 1000 according to the packet definitions for the spatial coding protocol.

Anchor lights A0-A2 each simultaneously and repetitively transmit the LSFD 1015. The LSFD includes 4 frames of the HiRate tone followed by 2 frames of the frequency F1, for a total of 6 frames.

In parallel, information lights B0, B2, B6, and B8 each transmit frequency F1 (1025) indicative of a logic bit 1, while the other information lights transmit frequency F0 (1020) indicative of a logic 0.

Six sequential frames are required for the LSFD and they repeat cyclically.

Figure 11B:
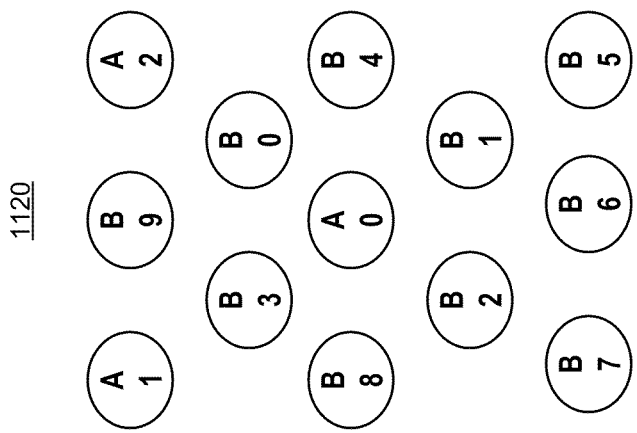
FIG. 11B is a diagram of a predetermined image reference template accessible to the receiver of FIG. 11A.
Figure 11A:
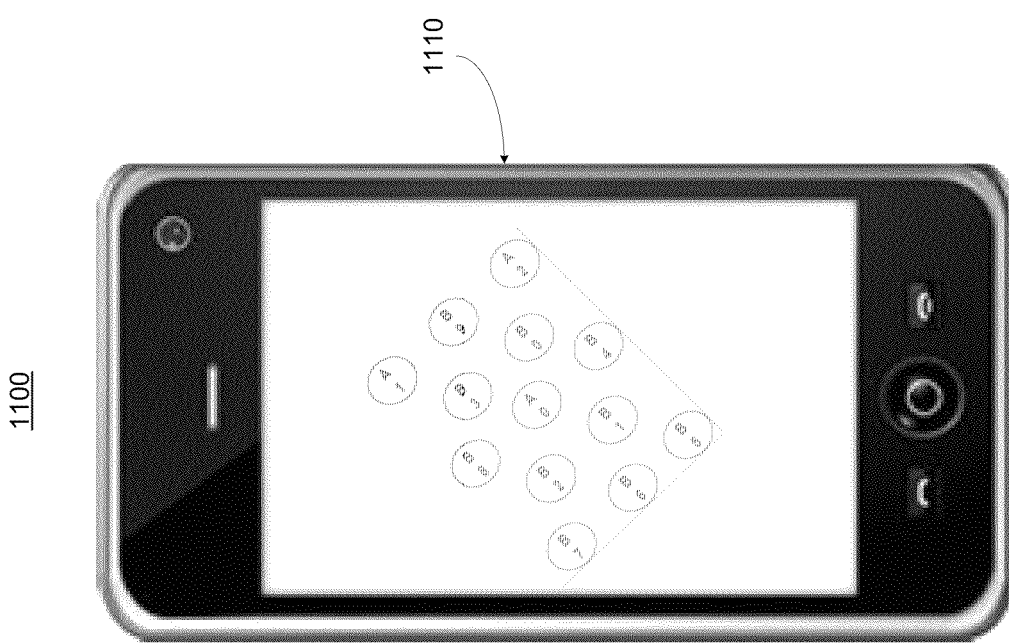
FIG. 11A is a diagram of a light receiver including an image sensor for recording sequential images of all of the modulated light beams transmitted from the light array of FIG. 10A.

FIG. 11A is a diagram of a light receiver 1100, such as a smartphone, including an image sensor for recording sequential images and a screen to display the receiver recording 1110 of all of the modulated light beams transmitted from light array 1000. Images 1110 are recorded in an arbitrary planar orientation and with a spatial size determined by the size of the imaging sensor in the light receiver 1100.

FIG. 11B is a diagram of a predetermined image reference template 1120, to which receiver 1100 has access. Template may be stored in receiver 1100 or otherwise downloaded to the receiver wirelessly or through a wired interface. Template 1120 is a scaled representation of light array 1000, which includes positions for each of the anchor lights, each of the information lights, and bit assignments for the information lights according to their positions in the template relative to the anchor light positions.

Light receiver 1100 implements spatial decoding in the following manner. The light receiver:

identifies the recorded anchor lights A0-A2 and their positions in the recorded images;

attempts to align the positions of the recorded anchor beams (triangle shape) with the template anchor light positions (also a triangle shape) so that the imaged anchor beams overlap the anchor lights in the template, e.g., rotates the recorded images by approximately 60 degrees, and scales the images by a factor of approximately 3;

identifies the recorded information light beams in the aligned images with the information lights in the template, and recovers their bit sequence numbers from the template; and demodulates the bits from the identified recorded information light beams and assembles a message based on the bit sequence numbers.

Space-Time Coding Examples

1. A first MIMO space-time coding example is for a light array having a single LED. The LED transmits only an ID (after the NSFD indicating space-time coding):

ID (8 bits): 4f

This would be transmitted from the LED as: SFD,4f

The total bits sent would be: 2+8=10. At 15 bps the ID could be sent in 0.67 seconds. The number of bits in the ID is variable and is determined by counting the number of bits between the SFDs.

2. A second MIMO space-time coding example is for a single LED that transmits an ID and a payload.

ID (hex): a7

Payload (hex): b

This would be sent from the LED as: SFD, a7, DD, b

The total bits sent would be: 2+8+3+4=17. At 15 bps the ID with payload could be sent in 1.13 seconds.

3. A third MIMO space-time coding example is for a single LED that transmits a payload without an ID.

ID (hex): none

Payload (hex): b

This would be sent from the LED as: SFD, DD, b

The total bits sent would be: 2+3+4=9. At 15 bps the ID with payload could be sent in 0.6 seconds.

FIGS. 12A, 12B, and 12C are diagrams associated with different examples of space-time coding.

FIG. 12A is a MIMO space-time coding example of spatial multiplexing. Eight LEDs (LED0-LED7) with different IDs transmit an Internet Protocol (IP) address having 8 groups of 16-bits. Each LED transmits a different payload. In the example, LED0 transmits address bits 67cf, LED1 transmits address bits fe21, and so on.

FIG. 12B is MIMO space-time coding example of spatial redundancy with an ID. Eight LEDs (LED0-LED7) with the same ID (0) transmit the same short payload 9f.

FIG. 12C is another MIMO space-time coding example in which 8 LEDs (LED0-LED7) each transmit a different ID with a 16-bit payload in an uncoordinated manner. This means that the 8 LEDs transmit a continuous chain of packets each of which does not necessarily begin with a SFD. The continuous packet chain is repeated cyclically, and can be un-wrapped by the receiver.

Application Example

Figure 12D:
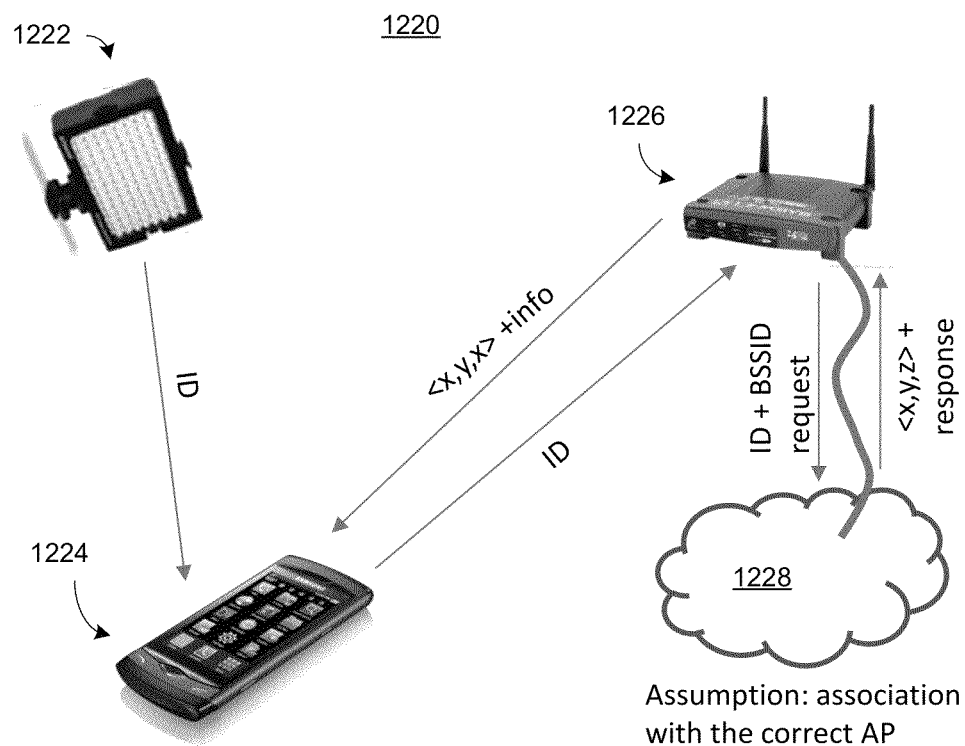
FIG. 12D is a block diagram of an example system in which MIMO light protocols may be used to access information related to a light array from a remote network.

FIG. 12D is a block diagram of an example system 1220 in which MIMO light protocols may be used to access information related to a light array from a network. System 1220 includes: a transmit light array 1222 configured, e.g., in accordance with any light array described herein; a user device 1224 (such as a smartphone), including a light receiver and a wireless transceiver communicatively coupled to each other; a network access point (NAP) 1226 (e.g., a wireless router); and a cloud service 1228 hosted in a network, such as the Internet. Light array 1222 transmits light in accordance with a MIMO light protocol described herein to the light receiver of user device 1224, which is configured to receive and process the received light in accordance with the MIMO protocol. The wireless transceiver of user device 1224 communicates wirelessly with NAP 1226, which in turn communicates with cloud service 1228.

In an exemplary application, light array 1222 transmits one or more light IDs of lights in the array to user device 1224 using a MIMO light protocol, in the manner described above. The wireless transceiver of user device 1224 transmits the one or more light IDs to NAP 1226. NAP 1226 appends its own address identifier, such as a media access control (MAC) address or BSSID, to the one of more received light IDs, to produce a unique compound identifier, e.g., "ID+BSSID," which represents a globally unique identifier (also referred to herein as a "unique index") associated with light array 1222. NAP 1226 wraps the compound identifier in a request for further information regarding the light array associated with the compound identifier, e.g., position information (x, y, z coordinates), etc., and sends the request to cloud service 1228.

Cloud service 1228 includes a light database to store a variety of information related to many different light arrays, such as, but not limited to, position information, vendor/product, or other commercial information, etc., and associates each of the different light arrays (including light array 1222) with a unique a unique index, such as a unique compound identifier. When cloud service 1228 receives the request from NAP 1226, the cloud service accesses the specific information solicited in the request received from the NAP based on the compound identifier or unique index in that request, wraps the accessed information in a response, and sends the response to the NAP. In turn, NAP 1226 transmits the response information, e.g., position information x, y, z, to the transceiver of user device 1224, which makes the information available to a user if appropriate, e.g., via a display.

Two further embodiments of the above application are described below with reference to FIG. 12D, generally, however the specific signal exchanges associated with each of these variations are not depicted explicitly in FIG. 12D.

In a further embodiment of the application, light array 1222 may transmit to the light receiver of user device 1224 a light packet, including an optional light ID and an IP address in the packet payload. Then, the transceiver of user device 1224 transmits the light ID (if available) and the IP address to NAP 1226. In turn, NAP 1226 transmits to cloud service 1228 a request for information about the light array (e.g., position), where the request includes the IP address. The IP address represents the unique index, and the presence of the IP address obviates the need for the MAC ID referenced above in connection with the previously described embodiment of the application. Cloud service 1228 associates the IP address with the necessary solicited information stored in the cloud service database, accesses that information, and sends it to NAP 1226 in a response. NAP 1226 transmits the received information to transceiver 1224.

In yet another embodiment of the application, light array 1222 may transmit to user device 1224 a light packet, including a light ID and a hash associated with a BSSID of a NAP in the vicinity of the light array. The transceiver of user device 1224 may be communicating with multiple NAPs each having an associated BSSID, all of which are known to the transceiver. The transceiver of user device 1224 must identify which one of the many known BSSIDs is associated with the BSSID hash received from light array 1222. Accordingly, the transceiver of user device 1224 converts each of the known BSSIDs to an associated hash and searches for a match between the converted hashes and the hash received from light array 1222. User device 1224 selects the BSSID associated with the converted hash that matches the hash from light array 1222, and transmits the light ID and the matched/selected BSSID to the appropriate NAP 1226. In turn, NAP 1226 solicits information from cloud service 1228, and the ensuing process follows the same actions as described above in connection with the application described above.

Accordingly, in each of the application embodiments above, light array 1222 is configured to transmit modulated light beams simultaneously to convey light packets, each of which includes sequential fields formatted in accordance with any of the MIMO light protocols described herein, e.g., the sequential fields may include a start delimiter, and at least one field following the start delimiter, such as a light ID, and a data payload, such as an IP address or a hash of a network address. User device 1224, NAP 1226, and the network service 1228 are each configured to exchange messages with each other so as to generate the unique index, based at least in part on the demodulated fields of the light packets, access the appropriate network service database record based on the generated unique index, and communicate the accessed record to the user device. Exemplary logic modules enabling user device 1224, NAP 1226, and network service 1228 to perform the above described actions are described below in connection with FIG. 18A.

Method Flowcharts

Spatial Coding/Decoding Method

Figure 13:
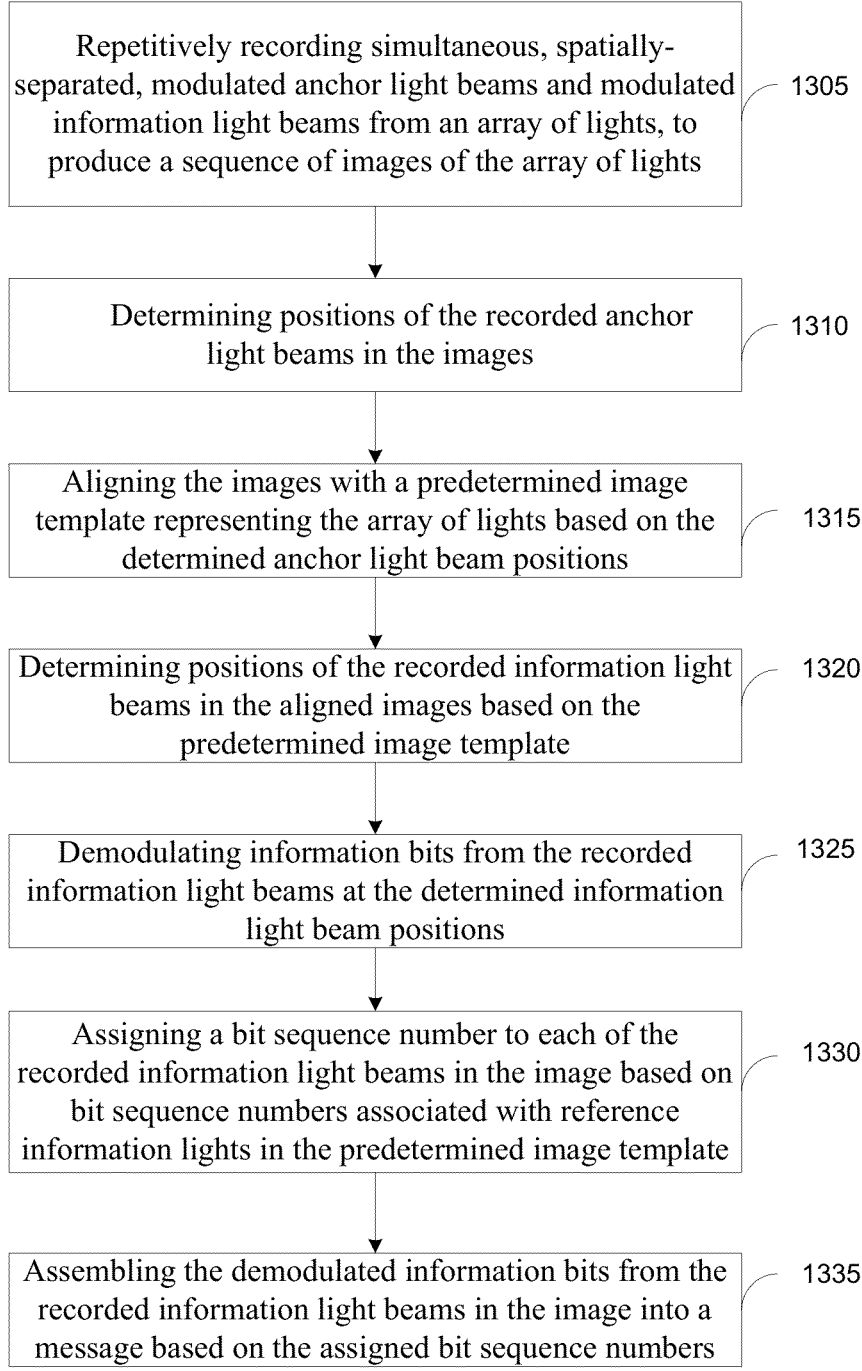
FIG. 13 is a flowchart of an example method of processing recorded light in a receiver in accordance with a MIMO protocol of spatial coding/decoding.

FIG. 13 is a flowchart of an example method 1300 of processing recorded light in a receiver to implement a MIMO protocol of spatial coding/decoding.

1305 includes repetitively recording simultaneous, spatially-separated, modulated anchor light beams and modulated information light beams from an array of lights, to produce a sequence of images of the array of lights.

1310 includes determining positions of the recorded anchor light beams in the images.

1315 includes aligning the images with a predetermined image template representing the array of lights based on the determined anchor light beam positions.

1320 includes determining positions of the recorded information light beams in the aligned images based on the predetermined image template.

1325 includes demodulating information bits from the recorded information light beams at the determined/aligned information light beam positions.

1330 includes assigning a bit sequence number to each of the recorded information light beams in the image based on bit sequence numbers associated with reference information lights in the predetermined image template.

1335 includes assembling the demodulated information bits from the recorded information light beams in the image into a message based on the assigned bit sequence numbers.

Multiple Protocol Handling Method

FIG. 14 is a flowchart of an example method 1400 of processing recorded light in an receiver in accordance with one of multiple MIMO protocols.

1405 includes recording a sequence of images of a group of simultaneous, spatially-separated, modulated light beams transmitted from a group of lights.

1410 includes detecting, in at least some of the recorded light beams, a start delimiter spanning a first sequence of the images, wherein the start delimiter indicates one of multiple possible protocols in which the group of lights transmits. This may include detecting in the recorded light beams a HiRate frequency spanning a predetermined number of images and indicative of the start delimiter.

1415 includes demodulating, from each of at least some of the recorded light beams, sequential data fields each spanning a sequence of images following the start delimiter. 1415 may include demodulating/detecting first and second frequencies in the recorded light beams, each frequency spanning a predetermined number of images, where the first frequency represents a logic 0 data bit and the second frequency represents a logic 1 data bit

1420 includes processing the demodulated sequential data fields according to the indicated protocol.

Figure 15:
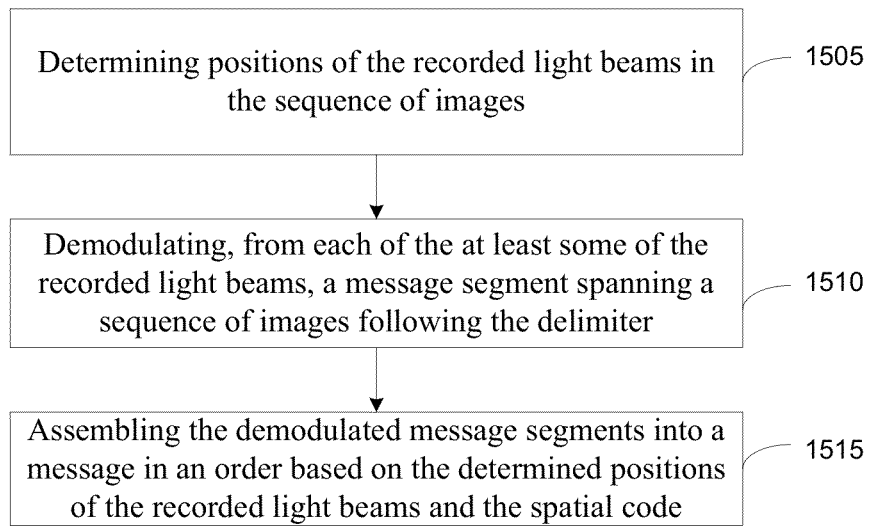
FIG. 15 is a flowchart of an example method expanding on a processing block of the method of FIG. 14.

FIG. 15 is a flowchart of an example method 1500 expanding on processing block 1420 of method 1400. Method 1500 assumes that at 1410 the detected delimiter indicates a MIMO protocol in which a group of lights transmits message segments of a message simultaneously according to a spatial code.

1505 includes determining positions of the recorded light beams in the sequence of images.

1510 includes demodulating, from each of the at least some of the recorded light beams, a message segment spanning a sequence of images following the delimiter.

1515 includes assembling the demodulated message segments into a message in an order based on the determined positions of the recorded light beams from 1505 and the spatial code.

Figure 16:
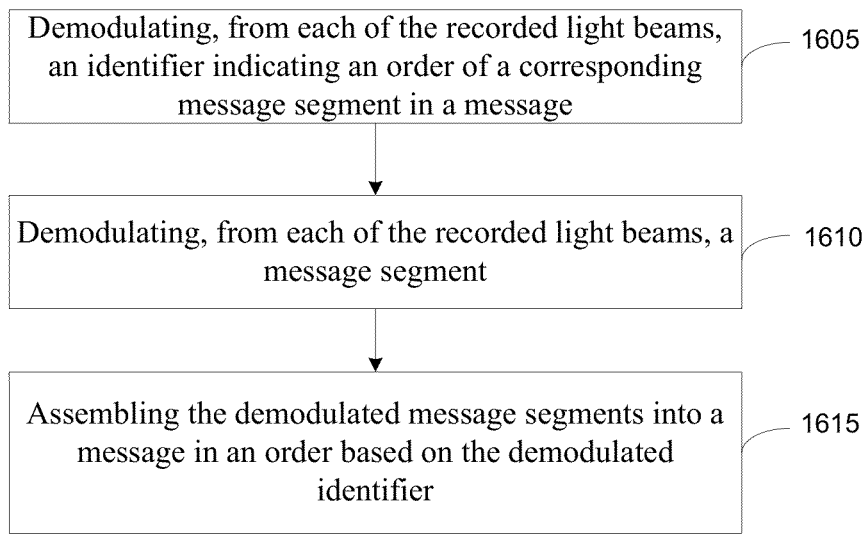
FIG. 16 is a flowchart of an example method expanding on the processing block of the method of FIG. 14.

FIG. 16 is a flowchart of an example method 1600 expanding on processing block 1420 of method 1400. Method 1600 assumes that at 1410 the detected delimiter indicates a MIMO protocols in which a group of lights transmits message segments of a message simultaneously according to a space-time, spatial multiplexing code.

1605 includes demodulating, from each of the recorded light beams, an identifier indicating an order of a corresponding message segment in a message.

1610 includes demodulating, from each of the recorded light beams, a message segment.

1615 includes assembling the demodulated message segments into a message in an order based on the demodulated identifier.

Figure 17:
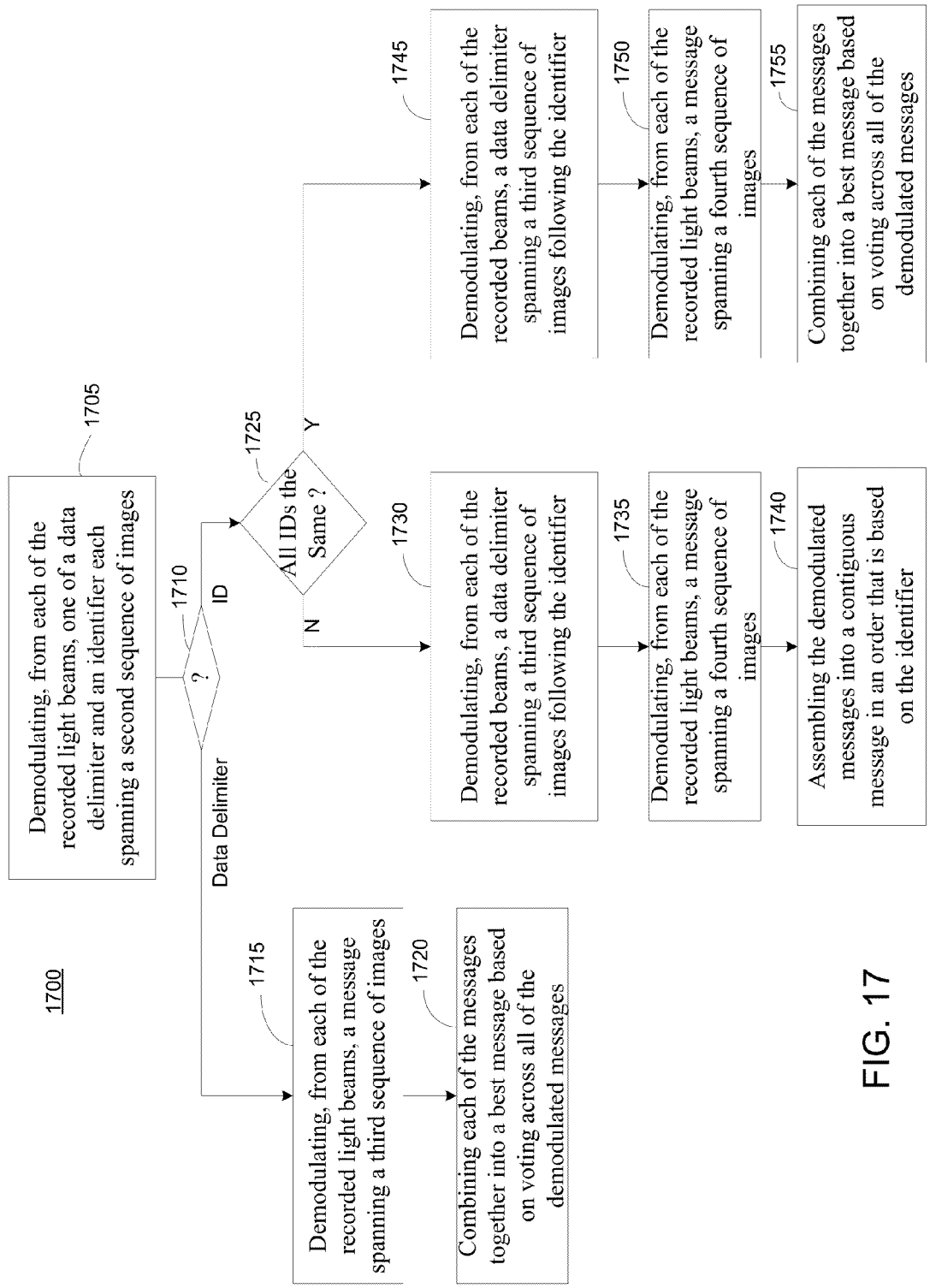
FIG. 17 is a flowchart of an example method expanding on the demodulating and the processing blocks of the method of FIG. 14.

FIG. 17 is a flowchart of an example method 1700 expanding on the demodulating and processing in blocks 1415 and 1420 of FIG. 14. In method 1700, block 1705 expands on demodulating block 1415, while the remainder of the blocks 1710-1755 expand on processing block 1420.

1705 includes demodulating, from each of the recorded light beams, one of a data delimiter (DD) and an identifier (ID) each spanning a second sequence of images (following the start delimiter).

1710 includes determining if the data delimiter or the ID was demodulated at 1705. If the DD was demodulated, then flow proceeds to 1715-1720.

1715 includes demodulating, from each of the recorded light beams, a message (e.g., data bits) spanning a third sequence of images.

1720 includes combining each of the demodulated messages together into a best message based on voting across all of the demodulated messages.

Returning to 1710, if at 1705 the ID was demodulated instead of the DD, then flow proceeds to 1725.

1725 includes determining if all of the demodulated IDs are the same.

If they are NOT the same, then flow proceeds to 1730-1740.

1730 includes demodulating, from each of the recorded beams, a DD spanning a third sequence of images.

1735 includes demodulating, from each of the recorded light beams, a message spanning a fourth sequence of images.

1740 includes assembling the demodulated messages into a contiguous message in an order that is based on the ID.

If all of the IDs ARE the same, then flow proceeds to 1745-1755.

1745 includes demodulating, from each of the recorded light beams, a DD spanning a third sequence of images following the ID.

1750 includes demodulating, from each of the recorded light beams, a message spanning a fourth sequence of images.

1755 includes combining each of the demodulated messages together into a best message based on voting across all of the demodulated messages.

Computer Processor System

Figure 18:
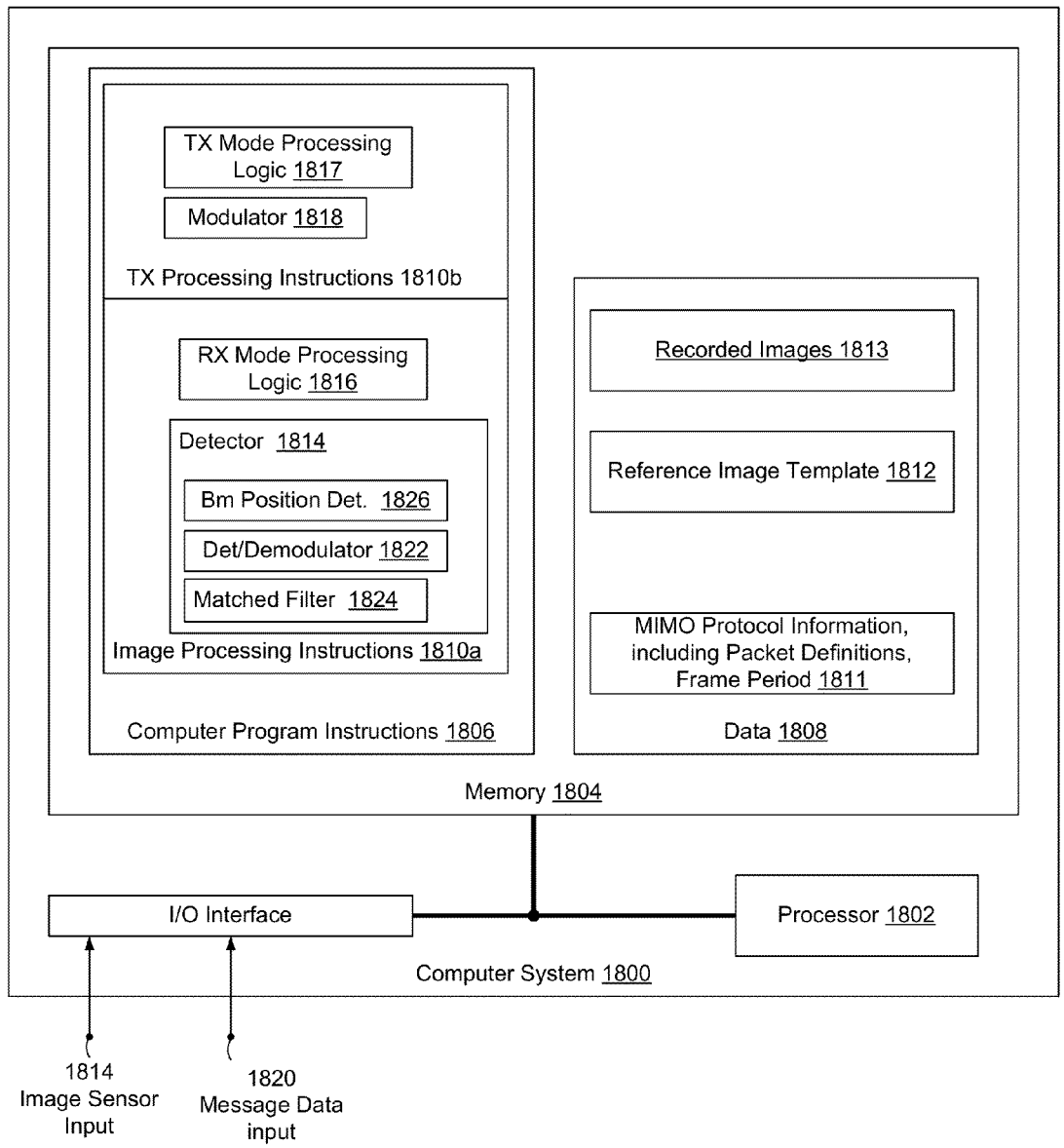
FIG. 18 is a block diagram of an example computer processor system configured for MIMO protocol processing.

FIG. 18 is a block diagram of an example computer processor system 1800 configured for MIMO protocol processing, including light modulation and demodulation.

Processor system 1800 may include one or more instruction processing units, illustrated here as a processor 1802, which may include a processor, one or more processor cores, or a micro-controller.

Computer system 1800 may include memory, cache, registers, and/or storage, illustrated here as memory 1804.

Memory 1804 may include one or more non-transitory computer readable mediums encoded with a computer program, including instructions 1806.

Memory 1804 may include data 1808 to be used by processor 1802 in executing instructions 1806, and/or generated by processor 1802 during execution of instructions 1806. Data 1808 includes MIMO protocol information 1811, including light packet protocol definitions, frame periods, and so on, a reference image template 1812, and recorded images 1813 from an image sensor/camera, which may be received through the I/O interface.

Instructions 1806 include instructions 1810a for light receiver (RX) processing of recorded images in accordance with one or more MIMO protocols, as described in one of the examples above. Instructions 1810a include instructions for implementing a detector 1814, and a receiver control/protocol processor 1816, as described in one or more examples above. Detector instructions 1814 further include instructions for implementing matched filters 1824, a detector/demodulator 1822 such as a FSOOK detector/demodulator, and a beam position determiner 1826, as described in one or more examples above. Beam position determiner 1826 may include logic to Instructions 1806 may also include instructions 1810b for a light transmitter operating in accordance with one or more MIMO protocol. Instructions 1810b include instructions 1817 for controlling the transmitter, and 1818 for implementing a modulator, such as a FSOOK modulator, as described in one or more examples above.

Figure 18A:
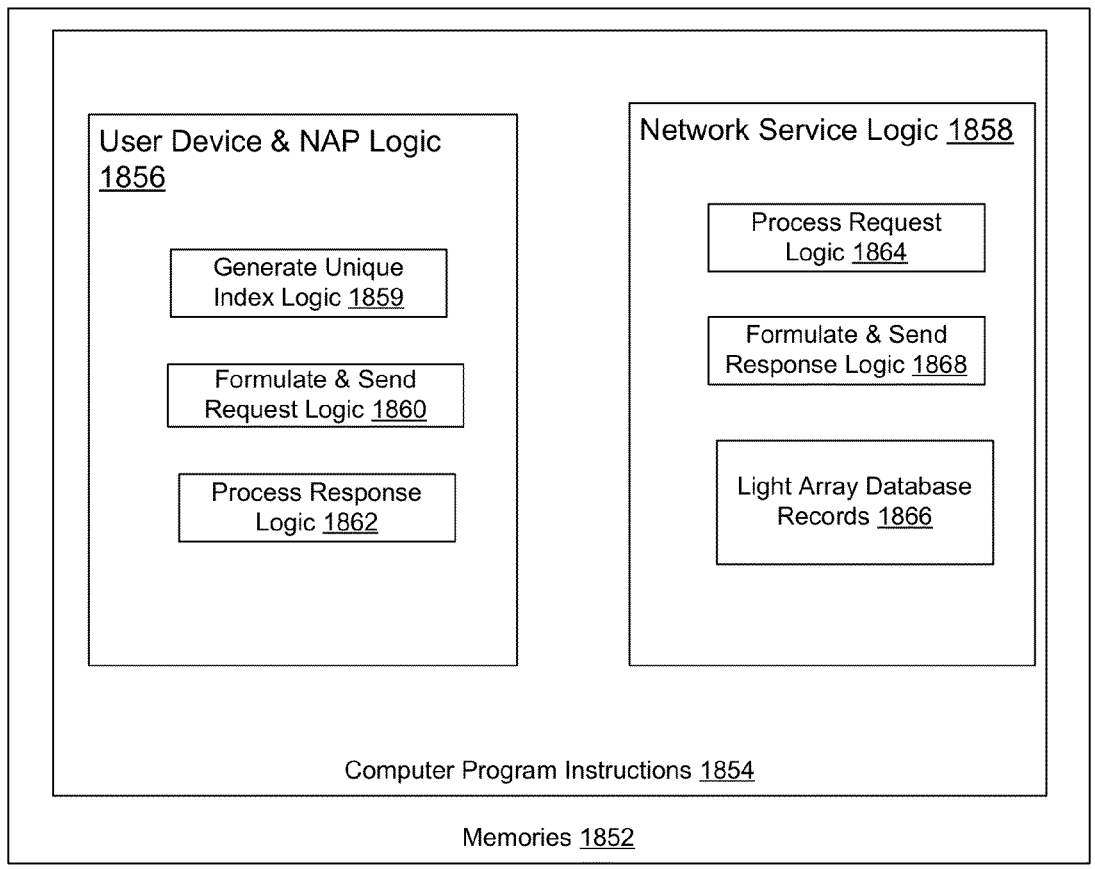
FIG. 18A is a block diagram of logic modules residing in one or more memories, which may reside in separate devices described in connection with FIG. 12D.

FIG. 18A is a block diagram of logic modules residing in one or more memories 1852, which may reside in separate devices, e.g., devices described in connection with FIG. 12D above with reference to exemplary application embodiments. Memories 1852 may include one or more non-transitory computer readable mediums encoded with computer programs, including instructions 1854. Instruction 1854 may include instructions 1856 for a user device, e.g., user device 1224, and/or a network access point (NAP), e.g., NAP 1226. The user device and the NAP may each be configured similarly to a system described below in connection with FIG. 19. Instructions 1854 may include instructions 1858 associated with a server or other computer hosted in a network or cloud service, e.g., network service 1228.

Instructions 1856 include instructions 1859 to generate a unique index from, e.g., (i) demodulated fields of light packets, including a light ID, an IP address, a hash of a network address, and (ii) from a NAP address, such as a media access control (MAC) address of a wireless router. Instructions 1856 include instructions 1860 to formulate and send requests from the NAP to the network service in relation to a light array. Instructions 1854 include instructions 1862 to process responses received from the network service at the NAP, and formulate transmit packets to be transmitted from the NAP to the user device based on the processed responses.

Instructions 1858 in the network/cloud service include:
- a. instructions 1864 to process requests from the NAP, which includes accessing database records 1866 (related to light arrays, which may include positional information about the light arrays, vendor information, or other commercially relevant information) based on a unique index carried in the requests from the NAP; and
- b. instructions 1868 to formulate and send a response to the NAP to satisfy the request from the NAP.

Wireless Communication Receiver System

Figure 19:
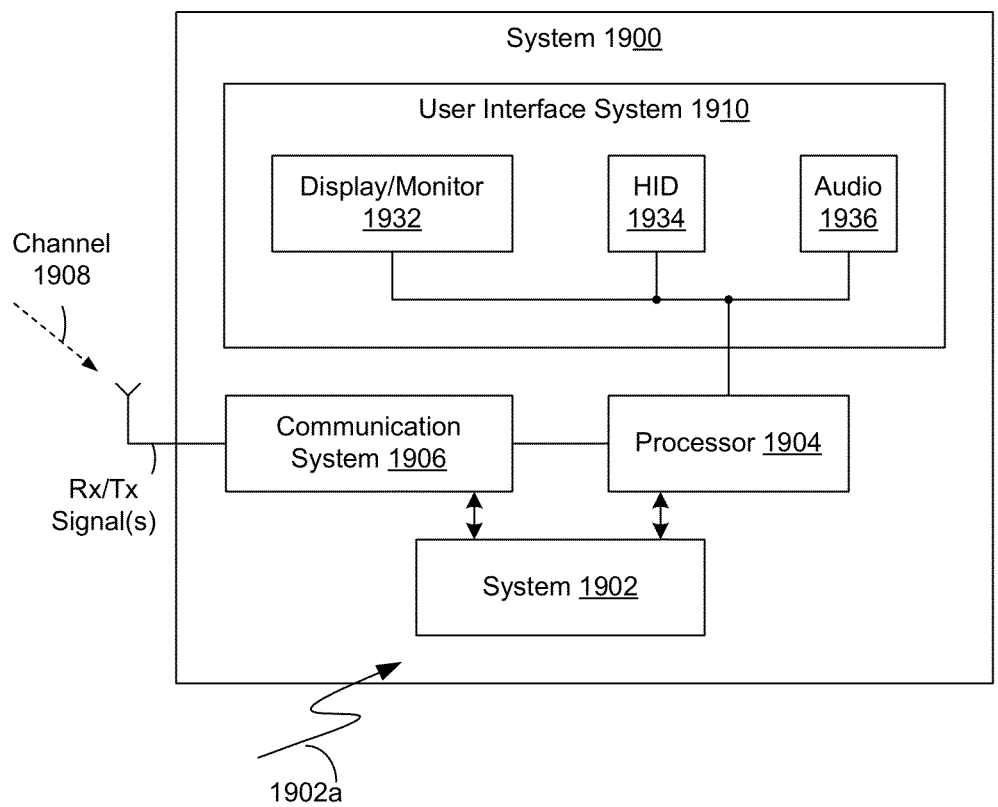
FIG. 19 is a block diagram of an example system including a system or apparatus to record light beams as a sequence of images and process the recorded images in accordance with one or more MIMO protocols.

FIG. 19 is a block diagram of an example system 1900 including a system or apparatus 1902 to record light beams 1902a as a sequence of images and process the recorded images in accordance with one or more MIMO protocols.

System 1902 may be implemented as described in one or more examples herein. System 1902 may be implemented as a light receiver as described in one or more examples herein. For example, system 1902 may comprise a light receiver, including an image sensor to record a sequence of images of a group of simultaneous, spatially-separated, modulated light beams transmitted from a group of lights. The light receiver may include a first module to determine positions of the recorded anchor light beams in the images, a second module to align the images with a predetermined image template representing the array of lights based on the determined anchor light beam positions, a third module to determine positions of the recorded information light beams in the aligned images based on the predetermined image template, and a fourth module to demodulate information bits from the recorded information light beams at the determined information light beam positions. The first, second, third, and fourth modules may be a combination of one or more controllers, memory, and computer program logic to cause the controllers to perform the actions described above.

System 1900 may include a processor 1904.

System 1900 may include a communication system, including a transceiver, 1906 to interface between system 1902, processor system 1904, and a communication network over a channel 1908. Communication system 1906 may include a wired and/or wireless communication system.

System 1900 or portions thereof may be implemented within one or more integrated circuit dies, and may be implemented as a system-on-a-chip (SoC).

System 1900 may include a user interface system 1910 to interface system 1910.

User interface system 1910 may include a monitor or display 1932 to display information from processor 1904.

User interface system 1910 may include a human interface device (HID) 1934 to provide user input to processor 1904. HID 1934 may include, for example and without limitation, one or more of a key board, a cursor device, a touch-sensitive device, and or a motion and/or image sensor. HID 1934 may include a physical device and/or a virtual device, such as a monitor-displayed or virtual keyboard.

User interface system 1910 may include an audio system 1936 to receive and/or output audible sound.

System 1900 may further include a transmitter system to transmit signals from system 1900.

System 1900 may correspond to, for example, a computer system, a personal communication device, and/or a television set-top box.

System 1900 may include a housing, and one or more of communication system 1902, digital processor system 1912, user interface system 1910, or portions thereof may be positioned within the housing. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, communication system 1902 may be implemented to receive a digital television broadcast signal, and system 1900 may include a set-top box housing or a portable housing, such as a mobile telephone housing. System 1900 may be implemented in a smartphone, or may be implemented as part of a wireless router.

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include one or more non-transitory mediums. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

Various computer program, method, apparatus, and system embodiments are described herein.

A. A Computer Program Embodiment

A non-transitory computer readable medium encoded with a computer program, including instructions to cause a processor to
- a. access a recording of a sequence of images of a group of simultaneous, spatially-separated, modulated light beams transmitted from a group of lights;
- b. detect, in at least some of the recorded light beams, a start delimiter spanning a first sequence of the images, wherein the start delimiter indicates one of multiple possible protocols in which the group of lights transmits; and
- c. demodulate, from each of at least some of the recorded light beams, sequential data fields each spanning a sequences of images following the start delimiter; and
- d. process the demodulated sequential data fields according to the indicated protocol.

Further instructions cause the processor to
a. detect one of
  i. a first delimiter indicative a first Multiple-In-Multiple-Out (MIMO) protocol in which the array of lights transmits according to a spatial code, and
  ii. a second delimiter indicative of a second MIMO protocol in which the array of lights transmits according to space-time code;
b. process the demodulated sequential data fields according to the first MIMO protocol when the first delimiter is detected; and
c. process the demodulated sequential data fields according to the second MIMO protocol when the first delimiter is detected.

The detected delimiter may indicate a MIMO protocol in which the group of lights is implemented to transmit message segments of a message simultaneously according to a spatial code, and the instructions to process further include instructions to cause the processor to:
  a. determine positions of the recorded light beams in the sequence of images;
  b. demodulate, from each of the at least some of the recorded light beams, a message segment spanning a sequence of images following the delimiter;
  c. assemble the demodulated message segments into a message in an order based on the determined positions of the recorded light beams and the spatial code.

The detected delimiter may indicate a MIMO protocol in which the group of lights is implemented to transmit message segments of a message simultaneously according to a space-time, spatial multiplexing code, and the instructions to process further include instructions to cause the processor to:
  a. demodulate, from each of the recorded light beams, an identifier indicating an order of a corresponding message segment in a message;
  b. demodulate, from each of the recorded light beams, a message segment; and
  c. assemble the demodulated message segments into a message in an order based on the demodulated identifier.

The instructions to cause the processor to demodulate further include instructions to cause the processor to demodulate, from each of the recorded light beams, one of a data delimiter and an identifier each spanning a second sequence of images.

The instructions to cause the processor to process further include instructions to cause the processor to:
  a. if the data delimiter is demodulated, then
    i. demodulate, from each of the recorded light beams, a message spanning a third sequence of images, and
    ii. combine each of the messages together into a best message based on voting across all of the demodulated messages.

The instructions to cause the processor to process further include instructions to cause the processor to:
  a. if the identifier is demodulated, then determine if each of the identifiers is the same; and
    i. if it is determined that each of the identifiers is not the same, then
      1. demodulate, from each of the recorded beams, a data delimiter spanning a third sequence of images,
      2. demodulate, from each of the recorded light beams, a message spanning a fourth sequence of images, and
      3. assemble the demodulated messages into a contiguous message in an order that is based on the identifier.

The instructions to cause the processor to process further include instructions to cause the processor to:
  a. if it is determined that each identifier is the same, then
    i. demodulate, from each of the recorded light beams, a data delimiter spanning a third sequence of images following the identifier, and
    ii. demodulate, from each of the recorded light beams, a message spanning a fourth sequence of images, and
    iii. combine each of the messages together into a best message based on voting across all of the demodulated messages.

The modulated light beams may be intensity modulated at one of at least three frequencies for a period of time spanning at least two sequential images in the sequence of images, the at least three frequencies including first and second frequencies indicative of respective first and second possible logic levels of a data bit, and a delimiter frequency indicative of the delimiter and that is greater than the first and second frequencies, wherein:
  a. the instructions to cause the processor to detect further include instructions to cause the processor to detect the delimiter frequency in the recorded light beams, and
  b. the instructions to cause the processor to demodulate further include instructions to cause the processor to demodulate one of the first and second frequencies in the recorded light beams.

B. Computer Program Embodiment

A non-transitory computer readable medium encoded with a computer program, including instructions to cause a processor to:
  a. access a recording of a sequence of images of a group of simultaneous, spatially-separated, anchor light beams and information light beams modulated light beams transmitted from a group of lights;
  b. determine positions of the recorded anchor light beams in the images;
  c. align the images with a predetermined image template representing the array of lights based on the determined anchor light beam positions;
  d. determine positions of the recorded information light beams in the aligned images based on the predetermined image template; and
  e. demodulate information bits from the recorded information light beams at the determined information light beam positions.

The instructions to cause the processor to determine positions of the recorded anchor light beams further include instructions to cause the processor to determine positions in the images at which the recorded modulated light conveys a delimiter indicative of an anchor light.

The instructions to cause the processor to align further include instructions to cause the processor to align the positions of the anchor light beams in the images to reference anchor light positions in the predetermined image template.

The instructions to cause the processor to align further include instructions to cause the processor to:
  a. rotate the images so that an orientation of a shape formed by the determined anchor light positions matches an orientation of a reference shape formed by the reference anchor light positions; and
  b. scale the images so that a size of the shape formed by the determined anchor light positions matches a size of the reference shape.

The instructions to cause the processor to:
  a. determine the positions of the recorded information light beams further include instructions to cause the processor to determine positions of the recorded information lights beams in the aligned images based on reference information light positions in the reference template; and b. demodulate further include instructions to cause the processor to demodulate, at the determined information light positions, first and second frequencies at which the modulated light is modulated, the first and second frequencies corresponding to first and second logic values of the information bits, respectively.

Further instructions cause the processor to:

a. assign a bit sequence number to each of the recorded information light beams in the image based on bit sequence numbers associated with reference information lights in the predetermined image template; and b. assemble the demodulated information bits from the recorded information light beams in the image into a message based on the assigned bit sequence numbers.

The image template may include:

a. reference anchor light positions corresponding to positions of the anchor lights in the light array; and b. reference information light positions corresponding to positions of the information lights in the light array.

C. Apparatus Embodiment

An apparatus, comprising:

a. an image sensor to record a sequence of images of a group of simultaneous, spatially-separated, modulated light beams transmitted from a group of lights;

b. a detector to
 i. detect, in at least some of the recorded light beams, a start delimiter spanning a first sequence of the images, wherein the start delimiter indicates one of multiple possible protocols in which the group of lights transmits, and
 ii. demodulate, from each of at least some of the recorded light beams, sequential data fields each spanning a sequences of images following the start delimiter; and c. a protocol processor to process the demodulated sequential data fields according to the indicated protocol.

The detector may be implemented to detect one of:

a. a first delimiter indicative a first Multiple-In-Multiple-Out (MIMO) protocol in which the array of lights transmits according to a spatial code; and b. a second delimiter indicative of a second MIMO protocol in which the array of lights transmits according to space-time code.

The protocol processor may be implemented to a. process the demodulated sequential data fields according to the first MIMO protocol when the first delimiter is detected, and b. process the demodulated sequential data fields according to the second MIMO protocol when the first delimiter is detected.

The detected delimiter may indicate a MIMO protocol in which the group of lights is implemented to transmit message segments of a message simultaneously according to a spatial code, and, in this case:

a. the detector is implemented to
 i. determine positions of the recorded light beams in the sequence of images, and
 ii. demodulate, from each of the at least some of the recorded light beams, a message segment spanning a sequence of images following the delimiter; and b. the protocol processor is implemented to assemble the demodulated message segments into a message in an order based on the determined positions of the recorded light beams and the spatial code.

The detected delimiter may indicate a MIMO protocol in which the group of lights is implemented to transmit message segments of a message simultaneously according to a space-time, spatial multiplexing code, and in this case:

a. the detector is implemented to
 i. demodulate, from each of the recorded light beams, an identifier indicating an order of a corresponding message segment in a message, and
 ii. demodulate, from each of the recorded light beams, a message segment; and b. the protocol processor is implemented to assemble the demodulated message segments into a message in an order based on the demodulated identifier.

The detector may be implemented to:

a. demodulate, from each of the recorded light beams, one of a data delimiter and an identifier each spanning a second sequence of images.

If the data delimiter is demodulated from the second sequence of images, then:

a. the detector is further implemented to demodulate, from each of the recorded light beams, a message spanning a third sequence of images; and b. the protocol processor is further implemented to combine each of the messages together into a best message based on voting across all of the demodulated messages.

If the identifier is demodulated from the second sequence of images, then the protocol processor is further implemented to determine if each of the identifiers is the same, and if it is determined that each of the identifiers is not the same, then:

a. the detector is further implemented to
demodulate, from each of the recorded beams, a data delimiter spanning a third sequence of images,
 a. demodulate, from each of the recorded light beams, a message spanning a fourth sequence of images; and b. the protocol processor is further implemented to assemble the demodulated messages into a contiguous message in an order that is based on the identifier.

If it is determined that each identifier is the same, then:

a. the detector is further implemented to
 i. demodulate, from each of the recorded light beams, a data delimiter spanning a third sequence of images following the identifier, and
 ii. demodulate, from each of the recorded light beams, a message spanning a fourth sequence of images; and b. the protocol processor is further implemented to combine each of the demodulated messages together into a best message based on voting across all of the demodulated messages.

The modulated light beams may be intensity modulated at one of at least three frequencies for a period of time spanning at least two sequential images in the sequence of images, the at least three frequencies including first and second frequencies indicative of respective first and second possible logic levels of a data bit, and a delimiter frequency indicative of the delimiter and that is greater than the first and second frequencies, wherein the detector is implemented to:

a. detect the delimiter frequency in the recorded light beams; and b. demodulate one of the first and second frequencies in the recorded light beams.

D. Method Embodiment

A method, comprising:

a. recording a sequence of images of a group of simultaneous, spatially-separated, modulated light beams transmitted from a group of lights;

b. detecting, in at least some of the recorded light beams, a start delimiter spanning a first sequence of the images, wherein the start delimiter indicates one of multiple possible protocols in which the group of lights transmits; and c. demodulating, from each of at least some of the recorded light beams, sequential data fields each spanning a sequences of images following the start delimiter; and d. processing the demodulated sequential data fields according to the indicated protocol.

The detecting may comprise detecting one of a. a first delimiter indicative a first Multiple-In-Multiple-Out (MIMO) protocol in which the array of lights transmits according to a spatial code, and b. a second delimiter indicative of a second MIMO protocol in which the array of lights transmits according to space-time code;

The processing may include processing demodulated sequential data fields according to the first MIMO protocol when the first delimiter is detected.

The processing may also include processing the demodulated sequential data fields according to the second MIMO protocol when the first delimiter is detected.

The detected delimiter may indicate a MIMO protocol in which the group of lights is implemented to transmit message segments of a message simultaneously according to a spatial code, wherein the processing comprises:

a. determining positions of the recorded light beams in the sequence of images;

b. demodulating, from each of the at least some of the recorded light beams, a message segment spanning a sequence of images following the delimiter;

c. assembling the demodulated message segments into a message in an order based on the determined positions of the recorded light beams and the spatial code.

The detected delimiter may indicate a MIMO protocol in which the group of lights is implemented to transmit message segments of a message simultaneously according to a space-time, spatial multiplexing code, and the processing may comprise:

a. demodulating, from each of the recorded light beams, an identifier indicating an order of a corresponding message segment in a message;

b. demodulating, from each of the recorded light beams, a message segment; and c. assembling the demodulated message segments into a message in an order based on the demodulated identifier.

The demodulating comprises:

a. demodulating, from each of the recorded light beams, one of a data delimiter and an identifier each spanning a second sequence of images.

The processing may comprise:

a. if the data delimiter is demodulated, then
   i. demodulating, from each of the recorded light beams, a message spanning a third sequence of images, and
   ii. combining each of the messages together into a best message based on voting across all of the demodulated messages.

The processing may comprise:

a. if the identifier is demodulated, then determining if each of the identifiers is the same; and
   i. if it is determined that each of the identifiers is not the same, then
      1. demodulating, from each of the recorded beams, a data delimiter spanning a third sequence of images following the identifier,
      2. demodulating, from each of the recorded light beams, a message spanning a fourth sequence of images, and
      3. assembling the demodulated messages into a contiguous message in an order that is based on the identifier.

The processing may comprise:

a. if it is determined that each identifier is the same, then
   i. demodulating, from each of the recorded light beams, a data delimiter spanning a third sequence of images following the identifier, and
   ii. demodulating, from each of the recorded light beams, a message spanning a fourth sequence of images, and
   iii. combining each of the messages together into a best message based on voting across all of the demodulated messages.

The modulated light beams may be intensity modulated at one of at least three frequencies for a period of time spanning at least two sequential images in the sequence of images, the at least three frequencies including first and second frequencies indicative of respective first and second possible logic levels of a data bit, and a delimiter frequency indicative of the delimiter and that is greater than the first and second frequencies, wherein:

a. the detecting may include detecting said delimiter frequency in the recorded light beams; and b. the demodulating may include demodulating one of said first and second frequencies in the recorded light beams.

The light beams may be free-space light beams.

E. Method Embodiment

A method, comprising:

a. repetitively recording simultaneous, spatially-separated, modulated anchor light beams and modulated information light beams from an array of lights, to produce a sequence of images of the array of lights;

b. determining positions of the recorded anchor light beams in the images;

c. aligning the images with a predetermined image template representing the array of lights based on the determined anchor light beam positions;

d. determining positions of the recorded information light beams in the aligned images based on the predetermined image template; and e. demodulating information bits from the recorded information light beams at the determined information light beam positions.

The determining of positions of the recorded anchor light beams includes determining positions in the images at which the recorded modulated light conveys a delimiter indicative of an anchor light.

The aligning comprises aligning the positions of the anchor light beams in the images to reference anchor light positions in the predetermined image template.

The aligning further comprises:

a. rotating the images so that an orientation of a shape formed by the determined anchor light positions matches an orientation of a reference shape formed by the reference anchor light positions; and b. scaling the images so that a size of the shape formed by the determined anchor light positions matches a size of the reference shape.

The determining of the positions of the recorded information light beam comprises determining positions of the recorded information lights beams in the aligned images based on reference information light positions in the reference template; and The demodulating includes demodulating, at the determined information light positions, first and second frequencies at which the modulated light is modulated, the first and second frequencies corresponding to first and second logic values of the information bits, respectively.

The method further comprises:
a. assigning a bit sequence number to each of the recorded information light beams in the image based on bit sequence numbers associated with reference information lights in the predetermined image template; and
b. assembling the demodulated information bits from the recorded information light beams in the image into a message based on the assigned bit sequence numbers.

The image template includes:
a. reference anchor light positions corresponding to positions of the anchor lights in the light array; and
b. reference information light positions corresponding to positions of the information lights in the light array.

F. Apparatus Embodiment

An apparatus, comprising:
a. a group of spatially separated lights implemented to operate in a selected one of a first MIMO protocol and a second MIMO protocol, wherein:
   i. in the first MIMO protocol, the group of lights includes anchor lights implemented to transmit in parallel modulated light indicative of a first MIMO delimiter, and information lights each implemented to transmit in parallel a respective segment of a message according to a spatial position of the information light in the group; and
   ii. in the second MIMO protocol, each of the lights is implemented to transmit modulated light packets in parallel, the light packets formatted to include sequential fields of modulated light indicative of a second MIMO delimiter, a message segment identifier, and a segment of a message.

Each light in the group of lights is implemented to transmit light that is intensity modulated at one of multiple frequencies for corresponding time periods, and each of the frequencies indicates one of a first logic level of a data bit of the message, a second logic level of a data bit of the message, and a delimiter.

The time periods corresponding to the frequencies of the logic levels of the data bit are harmonically related to an anticipated image sensor frame rate at which images of the group of lights are to be recorded in sequence by an image sensor.

The first MIMO delimiter includes light that is intensity modulated at a first frequency and a second frequency during consecutive first and second time periods, respectively, wherein the first frequency and the first time period are greater than the second frequency and the second time period, respectively.

The second MIMO delimiter includes light that is intensity modulated at the first frequency and the second frequency during consecutive third and fourth time periods, respectively, wherein the third and fourth time periods for the second MIMO delimiter are the same.

G. Apparatus Embodiment

An apparatus, comprising:
a. a source of data bits each occupying a bit position in a message; and
b. a group of spatially separated lights, including
   i. anchor lights each having a predetermined position in the group and implemented to repetitively transmit, simultaneously with the other anchor lights, modulated light indicative of a delimiter;
   ii. information lights each having a predetermined position in the group relative to the anchor lights and that is assigned to a corresponding one of the bit positions, and each to transmit, simultaneously with the other information lights, modulated light indicative of the data bit occupying the assigned one of the bit positions.

The apparatus of claim 1, wherein:
a. each of the anchor lights is implemented to transmit light that is intensity ON-OFF keyed at a delimiter frequency; and
b. each of the information lights is implemented to transmit light that is intensity ON-OFF keyed at one of first and second frequencies indicative of one of first and second logic values of the data bit to be transmitted.

The apparatus further comprises an information light modulator for each of the lights, and the modulator comprises:
a. a frequency generator to generate a corresponding one of the frequencies associated with the light; and
b. a modulator to intensity modulate the light at the generated frequency.

H. Apparatus Embodiment

An apparatus, comprising:
a. a group of lights implemented to operate in accordance with a space-time protocol having first and second transmit protocols each defining a sequence of fields, each light implemented to transmit each field as modulated light in parallel with the other lights, wherein each of the lights are implemented to transmit
   i. in each of the first and second protocols, a delimiter during a first time period,
      in the first protocol,
         a data delimiter and a data payload during respective second and third time periods, and
   ii. in the second protocol, an identifier, a data delimiter, and a data payload during second, third, and fourth time periods.

The apparatus may further comprise a controller to receive a message and to divide the message into message segments each associated with a sequence number, wherein, in the second protocol, each light is implemented to transmit one of the message segments, and the identifier for that light is the associated message segment sequence number.

Each light may be implemented to transmit light that is intensity modulated at one of multiple frequencies for corresponding ones of the first, second, third, and fourth time periods.

The second, third, and fourth time periods may be harmonically related to an anticipated image sensor frame rate at which images of the group of lights are to be recorded in sequence by an image sensor.

I. System Embodiment

A system, comprising:
a. a communication system to communicate with a network;
b. a processor to interface between the communication system and a user interface system;
c. a light processing system, comprising;
   i. an image sensor to record a sequence of images of a group of simultaneous, spatially-separated, modulated light beams transmitted from a group of lights;
   ii. a detector to
      1. detect, in at least some of the recorded light beams, a start delimiter spanning a first sequence of the images, wherein the start delimiter indicates one of multiple possible protocols in which the group of lights transmits, and 2. demodulate, from each of at least some of the recorded light beams, sequential data fields each spanning a sequences of images following the start delimiter; and iii. a protocol processor to process the demodulated sequential data fields according to the indicated protocol; and d. a housing, wherein the processor, the communication system, and the light transmitter are positioned within the housing.

The communication system includes a wireless communication system, and the housing includes a mobile hand-held housing to house the communication system, the processor, the user interface system, and a battery.

J. System Embodiment

A system, comprising:

a. a communication system to communicate with a network;

b. a processor to interface between the communication system and a user interface system;

c. a light processing system, comprising:
  i. an image sensor to record a sequence of images of a group of simultaneous, spatially-separated, modulated light beams transmitted from a group of lights;
  ii. a first module to determine positions of the recorded anchor light beams in the images;
  iii. a second module to align the images with a predetermined image template representing the array of lights based on the determined anchor light beam positions;
  iv. a third module to determine positions of the recorded information light beams in the aligned images based on the predetermined image template; and
  v. a fourth module to demodulate information bits from the recorded information light beams at the determined information light beam positions; and d. a housing, wherein the processor, the communication system, and the light transmitter are positioned within the housing.

The communication system includes a wireless communication system, and the housing includes a mobile hand-held housing to house the communication system, the processor, the user interface system, and a battery.

K. Network Embodiment

A system, comprising:

a. a group of lights configured to transmit modulated light beams simultaneously to convey light packets, the light packets each including sequential fields formatted in accordance with a protocol, the sequential fields including a start delimiter and at least one field following the start delimiter;

b. a user device, including c. a light receiver to receive the modulated light beams, and, from the received modulated light beams, detect the start delimiter, and demodulate at least one of the at least one field following the start delimiter, and d. a wireless transceiver coupled to the light receiver;

e. a network access point (NAP) to communicate with the wireless transceiver of the user device;

f. a network service, accessible through the NAP, including a database of records each containing information relating to a light array and indexed according to a unique index, wherein the user device, the NAP, and the network system are each configured to exchange messages with each other so as to generate the unique index based, at least in part, on the demodulated at least one field following the start delimiter, access a record related to the group of lights in the network service database based on the generated unique index, and communicate the accessed record to the user device.

In the system:

a. the at least one field following the start delimiter in the light packet and demodulated by the light receiver is a light ID;

b. the wireless transceiver of the user device is configured to transmit the demodulated light ID to the NAP; and c. the NAP is configured to receive the light ID, and includes logic stored in memory and configured to cause the NAP to
  i. generate the unique index based on the light ID and a network address of the NAP, and
  ii. send a NAP request to the network service for information related to the group of lights, the NAP request including the unique index.

The network service is configured to:

a. receive the NAP request and access an appropriate database record based on the unique index in the received NAP request;

b. form a service response to the NAP request that includes the accessed record; and c. transmit the service response to the NAP.

The NAP is configured to receive the service response including the accessed database record, and transmit information from the record to the user device transceiver.

The NAP may be a wireless router and the network address of the NAP may be a media access control (MAC) address.

In the system:

a. the at least one field following the delimiter in the light packet and demodulated by the light receiver is an IP address;

b. the wireless transceiver of the user device is configured to transmit the demodulated IP address to the NAP;

c. the NAP is configured to receive the IP address, and includes logic stored in memory and configured to cause the NAP to
  i. form the unique index based on the IP address, and
  ii. send a NAP request to the network service for information related to the group of lights, the NAP request including the unique index.

The network service is configured to:

a. receive the NAP request and access an appropriate database record based on the unique index in the received NAP request;

b. form a service response to the NAP request that includes the accessed record; and c. transmit the service response to the NAP.

In the system:

a. the at least one field following the delimiter in the light packet and demodulated by the light receiver is a hash of a NAP address;

b. the user device is configured to convert the demodulated hash into the NAP address, and transmit to the NAP the converted NAP address;

c. the NAP is configured to receive the NAP address, and includes logic stored in memory and configured to cause the NAP to
  i. form the unique index based on the received NAP address, and
  ii. send a NAP request to the network service for information related to the group of lights, the NAP request including the unique index.

The network service is configured to:

a. receive the NAP request and access an appropriate database record based on the unique index in the received NAP request;

b. form a service response to the NAP request that includes the accessed record; and c. transmit the service response to the NAP.

The database record may include a position of the group of lights, which is accessed and communicated to the user device.

Each of the sequential fields in the light packet may comprise light that is intensity modulated at a predetermined frequency for a predetermined time period to indicate the start delimiter and the at least one field following the start delimiter.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. A non-transitory computer readable medium encoded with a computer program, including instructions to cause a processor to:

access a recording of a sequence of images of a group of simultaneous, spatially-separated, modulated light beams transmitted from a group of lights;

detect, in at least some of the recorded light beams, a start delimiter spanning a first sequence of the images, wherein the start delimiter indicates one of multiple possible protocols in which the group of lights transmits; and demodulate, from each of at least some of the recorded light beams, sequential data fields each spanning a sequences of images following the start delimiter; and process the demodulated sequential data fields according to the indicated protocol.

2. The computer readable medium of claim 1, further including instructions to cause the processor to detect one of a first delimiter indicative a first Multiple-In-Multiple-Out (MIMO) protocol in which the array of lights transmits according to a spatial code, and a second delimiter indicative of a second MIMO protocol in which the array of lights transmits according to space-time code;

process the demodulated sequential data fields according to the first MIMO protocol when the first delimiter is detected; and process the demodulated sequential data fields according to the second MIMO protocol when the first delimiter is detected.

3. The computer readable medium of claim 1, wherein said detected delimiter indicates a MIMO protocol in which the group of lights is implemented to transmit message segments of a message simultaneously according to a spatial code, and wherein the instructions to cause the processor to process further include instructions to cause the processor to:

determine positions of the recorded light beams in the sequence of images;

demodulate, from each of the at least some of the recorded light beams, a message segment spanning a sequence of images following the delimiter;

assemble the demodulated message segments into a message in an order based on the determined positions of the recorded light beams and the spatial code.

4. The computer readable medium of claim 1, wherein said detected delimiter indicates a MIMO protocol in which the group of lights is implemented to transmit message segments of a message simultaneously according to a space-time, spatial multiplexing code, and wherein the instructions to cause the processor to process further include instructions to cause the processor to:

demodulate, from each of the recorded light beams, an identifier indicating an order of a corresponding message segment in a message;

demodulate, from each of the recorded light beams, a message segment; and assemble the demodulated message segments into a message in an order based on the demodulated identifier.

5. The computer readable medium of claim 1, wherein the instructions to cause the processor to demodulate further include instructions to cause the processor to:

demodulate, from each of the recorded light beams, one of a data delimiter and an identifier each spanning a second sequence of images.

6. The computer readable medium of claim 5, wherein the instructions to cause the processor to process further include instructions to cause the processor to:

if the data delimiter is demodulated, then demodulate, from each of the recorded light beams, a message spanning a third sequence of images, and combine each of the messages together into a best message based on voting across all of the demodulated messages.

7. The computer readable medium of claim 5, wherein the instructions to cause the processor to process further include instructions to cause the processor to:

if the identifier is demodulated, then determine if each of the identifiers is the same; and if it is determined that each of the identifiers is not the same, then demodulate, from each of the recorded beams, a data delimiter spanning a third sequence of images, demodulate, from each of the recorded light beams, a message spanning a fourth sequence of images, and assemble the demodulated messages into a contiguous message in an order that is based on the identifier.

8. The computer readable medium of claim 7, wherein the instructions to cause the processor to process further include instructions to cause the processor to:

if it is determined that each identifier is the same, then demodulate, from each of the recorded light beams, a data delimiter spanning a third sequence of images following the identifier, and demodulate, from each of the recorded light beams, a message spanning a fourth sequence of images, and combine each of the messages together into a best message based on voting across all of the demodulated messages.

9. The computer readable medium of claim 1, wherein the modulated light beams are intensity modulated at one of at least three frequencies for a period of time spanning at least two sequential images in the sequence of images, the at least three frequencies including first and second frequencies indicative of respective first and second possible logic levels of a data bit, and a delimiter frequency indicative of the delimiter and that is greater than the first and second frequencies, wherein:

the instructions to cause the processor to detect further include instructions to cause the processor to detect the delimiter frequency in the recorded light beams, and the instructions to cause the processor to demodulate further include instructions to cause the processor to demodulate one of the first and second frequencies in the recorded light beams.

10. A non-transitory computer readable medium encoded with a computer program, including instructions to cause a processor to:
   access a recording of a sequence of images of a group of simultaneous, spatially-separated, anchor light beams and information light beams modulated light beams transmitted from a group of lights;
   determine positions of the recorded anchor light beams in the images;
   align the images with a predetermined image template representing the array of lights based on the determined anchor light beam positions;
   determine positions of the recorded information light beams in the aligned images based on the predetermined image template; and
   demodulate information bits from the recorded information light beams at the determined information light beam positions.

11. The computer readable medium of claim 10, wherein the instructions to cause the processor to determine positions of the recorded anchor light beams further include instructions to cause the processor to determine positions in the images at which the recorded modulated light conveys a delimiter indicative of an anchor light.

12. The computer readable medium of claim 10, wherein the instructions to cause the processor to align further include instructions to cause the processor to align the positions of the anchor light beams in the images to reference anchor light positions in the predetermined image template.

13. The computer readable medium of claim 12, wherein the instructions to cause the processor to align further include instructions to cause the processor to:
   rotate the images so that an orientation of a shape formed by the determined anchor light positions matches an orientation of a reference shape formed by the reference anchor light positions; and
   scale the images so that a size of the shape formed by the determined anchor light positions matches a size of the reference shape.

14. The computer readable medium of claim 10, wherein:
   the instructions to cause the processor to determine the positions of the recorded information light beams further include instructions to cause the processor to determine positions of the recorded information lights beams in the aligned images based on reference information light positions in the reference template; and
   the instructions to cause the processor to demodulate further include instructions to cause the processor to demodulate, at the determined information light positions, first and second frequencies at which the modulated light is modulated, the first and second frequencies corresponding to first and second logic values of the information bits, respectively.

15. The computer readable medium of claim 10, further including instructions to cause the processor to:
   assign a bit sequence number to each of the recorded information light beams in the image based on bit sequence numbers associated with reference information lights in the predetermined image template; and
   assemble the demodulated information bits from the recorded information light beams in the image into a message based on the assigned bit sequence numbers.

16. The computer readable medium of claim 10, wherein the image template includes:
   reference anchor light positions corresponding to positions of the anchor lights in the light array; and
   reference information light positions corresponding to positions of the information lights in the light array.

17. An apparatus, comprising:
   an image sensor to record a sequence of images of a group of simultaneous, spatially-separated, modulated light beams transmitted from a group of lights;
   a detector to
      detect, in at least some of the recorded light beams, a start delimiter spanning a first sequence of the images, wherein the start delimiter indicates one of multiple possible protocols in which the group of lights transmits, and
      demodulate, from each of at least some of the recorded light beams, sequential data fields each spanning a sequences of images following the start delimiter; and
   a protocol processor to process the demodulated sequential data fields according to the indicated protocol.

18. The apparatus of claim 17, wherein:
   the detector is implemented to detect one of
      a first delimiter indicative a first Multiple-In-Multiple-Out (MIMO) protocol in which the array of lights transmits according to a spatial code, and
      a second delimiter indicative of a second MIMO protocol in which the array of lights transmits according to space-time code; and
   the protocol processor is implemented to
      process the demodulated sequential data fields according to the first MIMO protocol when the first delimiter is detected, and
      process the demodulated sequential data fields according to the second MIMO protocol when the first delimiter is detected.

19. The apparatus of claim 17, wherein said detected delimiter indicates a MIMO protocol in which the group of lights is implemented to transmit message segments of a message simultaneously according to a spatial code, and wherein:
   the detector is implemented to
      determine positions of the recorded light beams in the sequence of images, and
      demodulate, from each of the at least some of the recorded light beams, a message segment spanning a sequence of images following the delimiter; and
   the protocol processor is implemented to assemble the demodulated message segments into a message in an order based on the determined positions of the recorded light beams and the spatial code.

20. The apparatus of claim 17, wherein said detected delimiter indicates a MIMO protocol in which the group of lights is implemented to transmit message segments of a message simultaneously according to a space-time, spatial multiplexing code, wherein:
   the detector is implemented to
      demodulate, from each of the recorded light beams, an identifier indicating an order of a corresponding message segment in a message, and
      demodulate, from each of the recorded light beams, a message segment; and
   the protocol processor is implemented to assemble the demodulated message segments into a message in an order based on the demodulated identifier.

21. The apparatus of claim 17, wherein the detector is implemented to:
  demodulate, from each of the recorded light beams, one of a data delimiter and an identifier each spanning a second sequence of images.

22. The apparatus of claim 21, wherein if the data delimiter is demodulated from the second sequence of images, then:
  the detector is further implemented to demodulate, from each of the recorded light beams, a message spanning a third sequence of images; and
  the protocol processor is further implemented to combine each of the messages together into a best message based on voting across all of the demodulated messages.

23. The apparatus of claim 21, wherein if the identifier is demodulated from the second sequence of images, then the protocol processor is further implemented to determine if each of the identifiers is the same, and if it is determined that each of the identifiers is not the same, then:
  the detector is further implemented to
    demodulate, from each of the recorded beams, a data delimiter spanning a third sequence of images,
    demodulate, from each of the recorded light beams, a message spanning a fourth sequence of images; and
  the protocol processor is further implemented to assemble the demodulated messages into a contiguous message in an order that is based on the identifier.

24. The apparatus of claim 23, wherein if it is determined that each identifier is the same, then:
  the detector is further implemented to
    demodulate, from each of the recorded light beams, a data delimiter spanning a third sequence of images following the identifier, and
    demodulate, from each of the recorded light beams, a message spanning a fourth sequence of images; and
  the protocol processor is further implemented to combine each of the demodulated messages together into a best message based on voting across all of the demodulated messages.

25. The apparatus of claim 17, wherein the modulated light beams are intensity modulated at one of at least three frequencies for a period of time spanning at least two sequential images in the sequence of images, the at least three frequencies including first and second frequencies indicative of respective first and second possible logic levels of a data bit, and a delimiter frequency indicative of the delimiter and that is greater than the first and second frequencies, wherein the detector is implemented to:
  detect the delimiter frequency in the recorded light beams; and
  demodulate one of the first and second frequencies in the recorded light beams.

26. A method, comprising:
  recording a sequence of images of a group of simultaneous, spatially-separated, modulated light beams transmitted from a group of lights;
  detecting, in at least some of the recorded light beams, a start delimiter spanning a first sequence of the images, wherein the start delimiter indicates one of multiple possible protocols in which the group of lights transmits; and
  demodulating, from each of at least some of the recorded light beams, sequential data fields each spanning a sequences of images following the start delimiter; and
  processing the demodulated sequential data fields according to the indicated protocol.

27. The method of claim 26, wherein:
  said detecting comprises detecting one of
    a first delimiter indicative a first Multiple-In-Multiple-Out (MIMO) protocol in which the array of lights transmits according to a spatial code, and
    a second delimiter indicative of a second MIMO protocol in which the array of lights transmits according to space-time code;
  said processing includes processing demodulated sequential data fields according to the first MIMO protocol when the first delimiter is detected; and
  said processing includes processing the demodulated sequential data fields according to the second MIMO protocol when the first delimiter is detected.

28. The method of claim 26, wherein said detected delimiter indicates a MIMO protocol in which the group of lights is implemented to transmit message segments of a message simultaneously according to a spatial code, wherein said processing comprises:
  determining positions of the recorded light beams in the sequence of images;
  demodulating, from each of the at least some of the recorded light beams, a message segment spanning a sequence of images following the delimiter;
  assembling the demodulated message segments into a message in an order based on the determined positions of the recorded light beams and the spatial code.

29. The method of claim 26, wherein said detected delimiter indicates a MIMO protocol in which the group of lights is implemented to transmit message segments of a message simultaneously according to a space-time, spatial multiplexing code, wherein said processing comprises:
  demodulating, from each of the recorded light beams, an identifier indicating an order of a corresponding message segment in a message;
  demodulating, from each of the recorded light beams, a message segment; and
  assembling the demodulated message segments into a message in an order based on the demodulated identifier.

30. The method of claim 26, wherein the demodulating comprises:
  demodulating, from each of the recorded light beams, one of a data delimiter and an identifier each spanning a second sequence of images.

31. The method of claim 30, wherein said processing comprises:
  if the data delimiter is demodulated, then
    demodulating, from each of the recorded light beams, a message spanning a third sequence of images, and
    combining each of the messages together into a best message based on voting across all of the demodulated messages.

32. The method of claim 30, wherein said processing comprises:
  if the identifier is demodulated, then determining if each of the identifiers is the same; and
  if it is determined that each of the identifiers is not the same, then
    demodulating, from each of the recorded beams, a data delimiter spanning a third sequence of images following the identifier,
    demodulating, from each of the recorded light beams, a message spanning a fourth sequence of images, and
    assembling the demodulated messages into a contiguous message in an order that is based on the identifier.

33. The method of claim 32, wherein said processing comprises:
if it is determined that each identifier is the same, then
demodulating, from each of the recorded light beams, a data delimiter spanning a third sequence of images following the identifier, and
demodulating, from each of the recorded light beams, a message spanning a fourth sequence of images, and
combining each of the messages together into a best message based on voting across all of the demodulated messages.

34. The method of claim 26, wherein the modulated light beams are intensity modulated at one of at least three frequencies for a period of time spanning at least two sequential images in the sequence of images, the at least three frequencies including first and second frequencies indicative of respective first and second possible logic levels of a data bit, and a delimiter frequency indicative of the delimiter and that is greater than the first and second frequencies;
said detecting including detecting said delimiter frequency in the recorded light beams; and
said demodulating including demodulating one of said first and second frequencies in the recorded light beams.

35. The method of claim 26, wherein the light beams are free-space light beams.

36. A method, comprising:
repetitively recording simultaneous, spatially-separated, modulated anchor light beams and modulated information light beams from an array of lights, to produce a sequence of images of the array of lights;
determining positions of the recorded anchor light beams in the images;
aligning the images with a predetermined image template representing the array of lights based on the determined anchor light beam positions;
determining positions of the recorded information light beams in the aligned images based on the predetermined image template; and
demodulating information bits from the recorded information light beams at the determined information light beam positions.

37. The method of claim 36, wherein said determining positions of the recorded anchor light beams includes determining positions in the images at which the recorded modulated light conveys a delimiter indicative of an anchor light.

38. The method of claim 36, wherein said aligning comprises aligning the positions of the anchor light beams in the images to reference anchor light positions in the predetermined image template.

39. The method of claim 38, wherein said aligning further comprises:
rotating the images so that an orientation of a shape formed by the determined anchor light positions matches an orientation of a reference shape formed by the reference anchor light positions; and
scaling the images so that a size of the shape formed by the determined anchor light positions matches a size of the reference shape.

40. The method of claim 36, wherein:
said determining the positions of the recorded information light beam comprises determining positions of the recorded information lights beams in the aligned images based on reference information light positions in the reference template; and
said demodulating includes demodulating, at the determined information light positions, first and second frequencies at which the modulated light is modulated, the first and second frequencies corresponding to first and second logic values of the information bits, respectively.

41. The method of claim 36, the method further comprising:
assigning a bit sequence number to each of the recorded information light beams in the image based on bit sequence numbers associated with reference information lights in the predetermined image template; and
assembling the demodulated information bits from the recorded information light beams in the image into a message based on the assigned bit sequence numbers.

42. The method of claim 36, wherein the image template includes:
reference anchor light positions corresponding to positions of the anchor lights in the light array; and
reference information light positions corresponding to positions of the information lights in the light array.

43. An apparatus, comprising:
a group of spatially separated lights implemented to operate in a selected one of a first MIMO protocol and a second MIMO protocol,
wherein in the first MIMO protocol, the group of lights includes anchor lights implemented to transmit in parallel modulated light indicative of a first MIMO delimiter, and information lights each implemented to transmit in parallel a respective segment of a message according to a spatial position of the information light in the group, and
wherein in the second MIMO protocol, each of the lights is implemented to transmit modulated light packets in parallel, the light packets formatted to include sequential fields of modulated light indicative of a second MIMO delimiter, a message segment identifier, and a segment of a message.

44. The apparatus of claim 43, wherein each light in the group of lights is implemented to transmit light that is intensity modulated at one of multiple frequencies for corresponding time periods, wherein each of the frequencies indicates one of a first logic level of a data bit of the message, a second logic level of a data bit of the message, and a delimiter.

45. The apparatus of claim 44, wherein the time periods corresponding to the frequencies of the logic levels of the data bit are harmonically related to an anticipated image sensor frame rate at which images of the group of lights are to be recorded in sequence by an image sensor.

46. The apparatus of claim 44, wherein:
the first MIMO delimiter includes light that is intensity modulated at a first frequency and a second frequency during consecutive first and second time periods, respectively, wherein the first frequency and the first time period are greater than the second frequency and the second time period, respectively; and
the second MIMO delimiter includes light that is intensity modulated at the first frequency and the second frequency during consecutive third and fourth time periods, respectively, wherein the third and fourth time periods for the second MIMO delimiter are the same.

47. An apparatus, comprising:
a source of data bits each occupying a bit position in a message; and
a group of spatially separated lights, including
anchor lights each having a predetermined position in the group and implemented to repetitively transmit, simultaneously with the other anchor lights, modulated light indicative of a delimiter;
information lights each having a predetermined position in the group relative to the anchor lights and that is assigned to a corresponding one of the bit positions, and each to transmit, simultaneously with the other information lights, modulated light indicative of the data bit occupying the assigned one of the bit positions.

48. The apparatus of claim 47, wherein:
each of the anchor lights is implemented to transmit light that is intensity ON-OFF keyed at a delimiter frequency; and
each of the information lights is implemented to transmit light that is intensity ON-OFF keyed at one of first and second frequencies indicative of one of first and second logic values of the data bit to be transmitted.

49. The apparatus of claim 47, further comprising an information light modulator for each of the lights, comprising:
a frequency generator to generate a corresponding one of the frequencies associated with the light; and
a modulator to intensity modulate the light at the generated frequency.

50. An apparatus, comprising:
a group of lights implemented to operate in accordance with a space-time protocol having first and second transmit protocols each defining a sequence of fields, each light implemented to transmit each field as modulated light in parallel with the other lights, wherein each of the lights are implemented to transmit
in each of the first and second protocols, a delimiter during a first time period,
in the first protocol,
a data delimiter and a data payload during respective second and third time periods, and
in the second protocol, an identifier, a data delimiter, and a data payload during second, third, and fourth time periods.

51. The apparatus of claim 50, further comprising a controller to receive a message and to divide the message into message segments each associated with a sequence number, wherein, in the second protocol, each light is implemented to transmit one of the message segments, and the identifier for that light is the associated message segment sequence number.

52. The apparatus of claim 50, wherein each light is implemented to transmit light that is intensity modulated at one of multiple frequencies for corresponding ones of the first, second, third, and fourth time periods.

53. The apparatus of claim 52, wherein the second, third, and fourth time periods are harmonically related to an anticipated image sensor frame rate at which images of the group of lights are to be recorded in sequence by an image sensor.

54. A system, comprising:
a communication system to communicate with a network;
a processor to interface between the communication system and a user interface system;
a light receiver, comprising:
an image sensor to record a sequence of images of a group of simultaneous, spatially-separated, modulated light beams transmitted from a group of lights;
a detector to
detect, in at least some of the recorded light beams, a start delimiter spanning a first sequence of the images, wherein the start delimiter indicates one of multiple possible protocols in which the group of lights transmits, and
demodulate, from each of at least some of the recorded light beams, sequential data fields each spanning a sequences of images following the start delimiter; and
a protocol processor to process the demodulated sequential data fields according to the indicated protocol; and
a housing,
wherein the processor, the communication system, and the light transmitter are positioned within the housing.

55. The system of claim 54, wherein:
the communication system includes a wireless communication system; and
the housing includes a mobile hand-held housing to house the communication system, the processor, the user interface system, and a battery.

56. A system, comprising:
a communication system to communicate with a network;
a processor to interface between the communication system and a user interface system;
a light receiver, comprising:
an image sensor to record a sequence of images of a group of simultaneous, spatially-separated, modulated light beams transmitted from a group of lights;
a first module to determine positions of the recorded anchor light beams in the images;
a second module to align the images with a predetermined image template representing the array of lights based on the determined anchor light beam positions;
a third module to determine positions of the recorded information light beams in the aligned images based on the predetermined image template; and
a fourth module to demodulate information bits from the recorded information light beams at the determined information light beam positions; and
a housing,
wherein the processor, the communication system, and the light transmitter are positioned within the housing.

57. The system of claim 56, wherein:
the communication system includes a wireless communication system; and
the housing includes a mobile hand-held housing to house the communication system, the processor, the user interface system, and a battery.

58. A system, comprising:
a group of lights configured to transmit modulated light beams simultaneously to convey light packets, the light packets each including sequential fields formatted in accordance with a protocol, the sequential fields including a start delimiter and at least one field following the start delimiter;
a user device, including
a light receiver to receive the modulated light beams, and, from the received modulated light beams, detect the start delimiter, and demodulate at least one of the at least one field following the start delimiter, and
a wireless transceiver coupled to the light receiver;
a network access point (NAP) to communicate with the wireless transceiver of the user device; and
a network service, accessible through the NAP, including a database of records each containing information relating to a light array and indexed according to a unique index,
wherein the user device, the NAP, and the network system are each configured to exchange messages with each other so as to generate the unique index based, at least in part, on the demodulated at least one field following the start delimiter, access a record related to the group of lights in the network service database based on the generated unique index, and communicate the accessed record to the user device.

59. The system of claim 58, wherein:
the at least one field following the start delimiter in the light packet and demodulated by the light receiver is a light ID;
the wireless transceiver of the user device is configured to transmit the demodulated light ID to the NAP; and
the NAP is configured to receive the light ID, and includes logic stored in memory and configured to cause the NAP to
generate the unique index based on the light ID and a network address of the NAP, and
send a NAP request to the network service for information related to the group of lights, the NAP request including the unique index.

60. The system of claim 59, wherein the network service is configured to:
receive the NAP request and access an appropriate database record based on the unique index in the received NAP request;
form a service response to the NAP request that includes the accessed record; and
transmit the service response to the NAP.

61. The system of claim 60, wherein the NAP is configured to receive the service response including the accessed database record, and transmit information from the record to the user device transceiver.

62. The system of claim 61, wherein the NAP is a wireless router and the network address of the NAP is a media access control (MAC) address.

63. The system of claim 58, wherein:
the at least one field following the delimiter in the light packet and demodulated by the light receiver is an IP address;
the wireless transceiver of the user device is configured to transmit the demodulated IP address to the NAP;
the NAP is configured to receive the IP address, and includes logic stored in memory and configured to cause the NAP to
form the unique index based on the IP address, and
send a NAP request to the network service for information related to the group of lights, the NAP request including the unique index.

64. The system of claim 63, wherein the network service is configured to:
receive the NAP request and access an appropriate database record based on the unique index in the received NAP request;
form a service response to the NAP request that includes the accessed record; and
transmit the service response to the NAP.

65. The system of claim 58, wherein:
the at least one field following the delimiter in the light packet and demodulated by the light receiver is a hash of a NAP address;
the user device is configured to convert the demodulated hash into the NAP address, and transmit to the NAP the converted NAP address;
the NAP is configured to receive the NAP address, and includes logic stored in memory and configured to cause the NAP to
form the unique index based on the received NAP address, and
send a NAP request to the network service for information related to the group of lights, the NAP request including the unique index.

66. The system of claim 65, wherein the network service is configured to:
receive the NAP request and access an appropriate database record based on the unique index in the received NAP request;
form a service response to the NAP request that includes the accessed record; and
transmit the service response to the NAP.

67. The system of claim 58, wherein the database record includes a position of the group of lights, which is accessed and communicated to the user device.

68. The system of claim 58, wherein each of the sequential fields in the light packet comprises light that is intensity modulated at a predetermined frequency for a predetermined time period to indicate the start delimiter and the at least one field following the start delimiter.

* * * * *